United States Patent [19]

Temime

[11] 4,369,464

[45] Jan. 18, 1983

[54] DIGITAL VIDEO SIGNAL ENCODING AND DECODING SYSTEM

[76] Inventor: Jean-Pierre Temime, 216, av. Aristide Briand, Bagneux, France, 92220

[21] Appl. No.: 166,853

[22] Filed: Jul. 8, 1980

[30] Foreign Application Priority Data

Jul. 9, 1979 [FR] France .............................. 79 17798

[51] Int. Cl.³ .......................................... H04N 7/12
[52] U.S. Cl. .................................. 358/136; 358/105
[58] Field of Search ............. 358/105, 133, 135, 136, 358/138

[56] References Cited

U.S. PATENT DOCUMENTS

| 3,439,753 | 4/1969 | Mounts | 358/135 |
| 3,940,555 | 2/1976 | Amano et al. | 358/135 |
| 4,027,331 | 5/1977 | Nicol | 358/136 |

OTHER PUBLICATIONS

Article by M. Deuimeux et al., Nov. 30, 1977, Societe des Electriciens.
Article by J. C. Candy, M. A. Franke, B. G. Haskell & F. W. Mounts–"Bell System Technical Journal", vol. 50, Jul.-Aug. 1971, New York.
Article by R. C. Nicol, "Conference on Digital Producing of Signals in Communication," Loughborough Univ. of Technology-Sep. '77.
Article by B. H. Haskell, R. L. Schmidt, "The Bell System Technical Journal", vol. 50, No. 8, Oct. 1975, pp. 1475-1495.
Article by von Gert Bostetmann in "Frequez", vol. 33, No. 1, Jan. 1979, Berlin-pp. 2 to 8.

Primary Examiner—Joseph A. Orsino, Jr.
Attorney, Agent, or Firm—Lowe, King, Price & Becker

[57] ABSTRACT

The system encodes a high rate digital video signal conveying picture elements into a low rate digital signal conveying words representative of some picture elements. The system comprises a frame store, a movement detector for detecting the movement area in one frame with respect to the preceding frame, a predictor, a bit distributing circuit for selecting the picture elements to be transmitted, a PCM encoder which encodes the DPCM words of the selected elements according to a quantization law and an interpolating circuit. The number of bits NB allocated to each line in the low rate digital signal is made constant. The movement detector detects two ledge elements defining each line moving area and thereby deduces the maximum number NP and average number $\bar{B}$ of bits in the element words to be encoded and transmitted. The bit distributing circuit down-counts the bits which remain for allocation to the line and the element words which remain likely to be encoded and compares these down-count totals for selectively controlling the encoding of a moving area element word. A transmitted and encoded word represents the level number with respect to a quantization law associated with the line.

14 Claims, 13 Drawing Figures

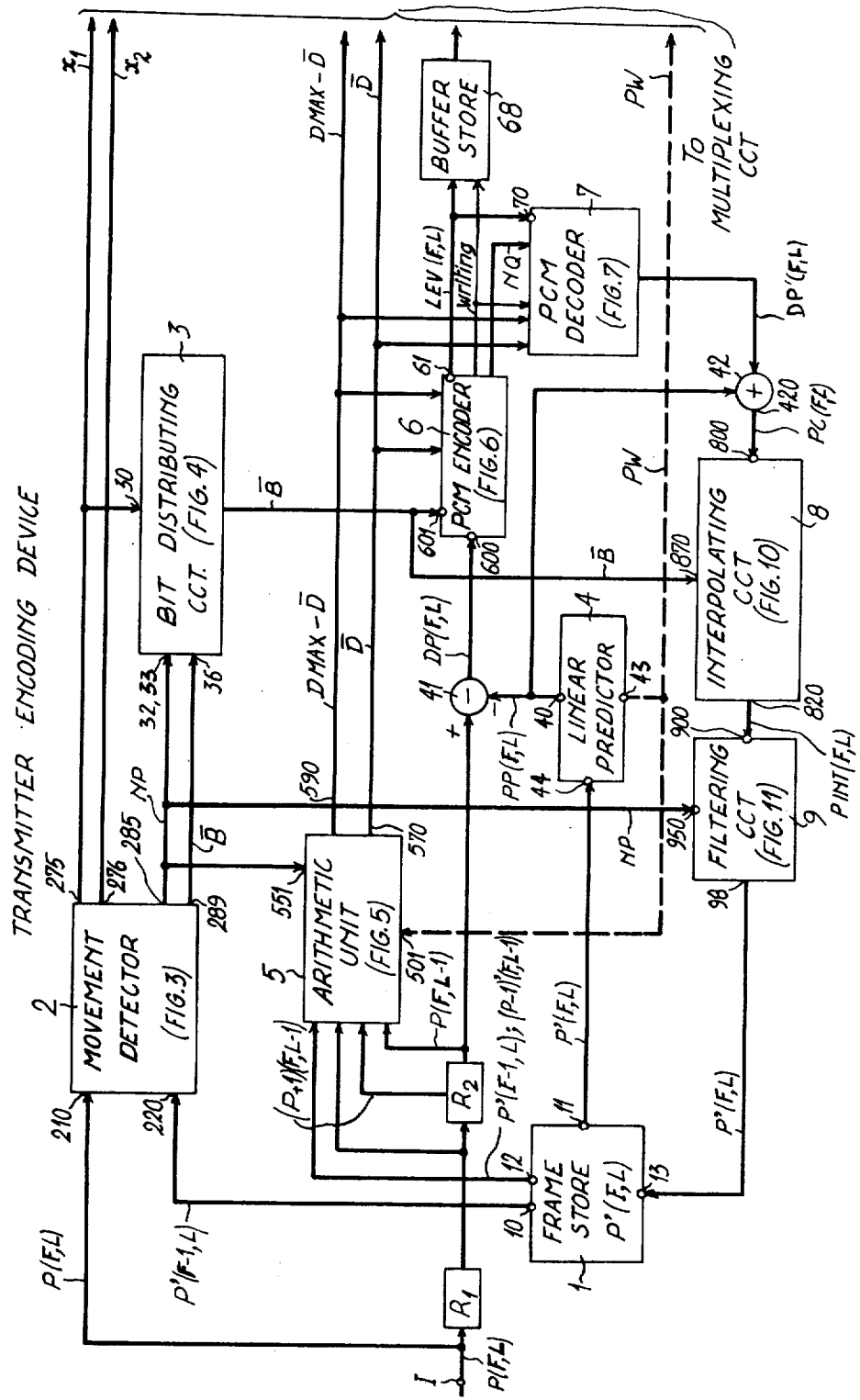

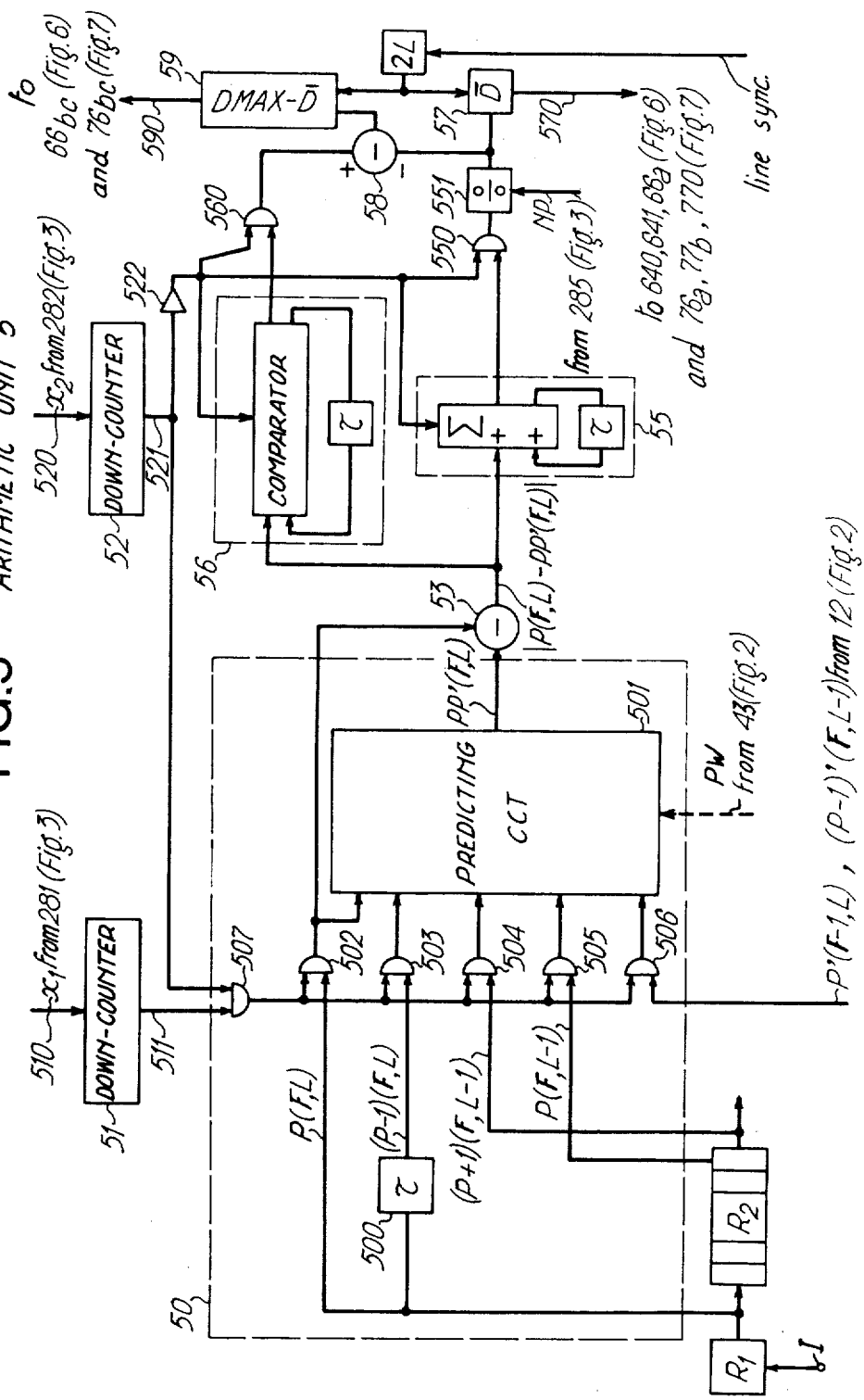

$$B = \frac{A+C}{2} \qquad D = \frac{3C+F}{4} \qquad E = \frac{C+3F}{4}$$

DIGITAL VIDEO SIGNAL ENCODING AND DECODING SYSTEM

BACKGROUND OF THE INVENTION

1. Field of the Invention

The present invention relates to a digital video signal encoding and decoding system in which the digital video signal delivered from a camera with a given high rate is constituted of words having a predetermined number of bits and representing picture elements and is encoded into a pulse code modulation (PCM) encoded signal transmitted along a low rate digital transmission medium conveying words representing certain picture elements. More particularly, the invention relates to a digital video system for transmitting videotelephone signals.

2. Description of the Prior Art

In the transmitter of a videotelephone system for a speaker, the video-telephone signal is delivered from the monitoring means asociated with the camera through analog-to-digital converting means in a PCM digital waveform having a high rate, such as approximately 16 to 18 Mbits/s, depending on the adopted video standard. Each word represents a picture line element comprising 8 bits the 8 bits provide 256 quantization levels between white and black. After DPCM differential encoding in the encoding device of the transmitter, the digital video signal is transmitted on the digital transmission medium at a low rate equal to approximately 2 Mbits/s. Reduction in the binary rate by a factor of approximately 8 corresponds on the average to a transmission of a bit per element.

However, to obtain satisfactory picture reconstitution in the decoding device of the receiver of the distant speaker, a minimum of 3 bits per picture element (pel) must be transmitted. Thus, the encoding device comprises means for selecting certain pels which are transmitted after having been encoded into differential pulse code modulation (DPCM) code. The decoding device comprises, at least, means for interpolating the untransmitted elements in terms of the transmitted and decoded elements to reconstitute the entire picture.

In this respect, the scope of this invention does not take in the digital video encoding and decoding systems in which all the pels are retransmitted in the form of differential PCM encoded words, each of which has a predetermined number of bits (equal to three, for example) and for which the outgoing binary rate lies approximately in the ratio between the incoming binary rate and this predetermined bit number (see, for instance, UK Patent Application No. 2,003,001).

In order to solve the above problem, so-called systematic replenishment encoding systems were previously described, in paragraph II of the published article by M. Devimeux, M. Jolivet and J. P. Temime in "Journées d'Etudes" of Nov. 30th and Dec. 1st 1977, of the French Society of Electricians, Electronicians and Radio-electricians in Rennes. Systematic replenishment encoding consists of transmitting a constant number of data bits allocated to a limited number of elements on successive pictures, generally with every third field of the picture encoded at 3 bits/pel. In this case, the encoding device transmits all the 3-bits/pel words in DPCM code for every third frame on the digital transmission medium. In the receiver, the decoding system reconstitutes the pairs of missing fields by interpolation between the adjacent transmitted fields. With this in mind, the decoding system comprises a field buffer which is read at the pel frequency. Such an encoding and decoding system introduces, in particular, temporal and spatial resolution losses and a very marked "jerk" effect, especially in the case of significant displacements of the moving area of the picture (generally, the speaker's face) on the fixed background. These losses stem from the fact that the frequency of the transmitted fields is one third of that of the real fields. It naturally follows from this that the alternation of the even and odd frames necessitates an interpolation of both the missing temporal and spatial fields.

Other higher performance encoding and decoding systems are known but are far more complex. They are called conditional replenishment systems. These systems comprise detector for detecting the movement of each video picture to control a pel word selection means so only certain pel words are encoded and transmitted depending on internal criteria. Such conditional replenishment systems are disclosed, inter alia, in the following documents:

article by M. Devimeux et al., already mentioned, paragraph III;

article by J. C. Candy, M. A. Franke, B. G. Haskell and F. W. Mounts in "The Bell System Technical Journal", vol. 50, July-August 1971, New York, Pages 1889 to 1918;

article by R. C. Nicol, "Conference on Digital Processing of Signals in Communication", Loughborough University of Technology, September 1977;

article by B. G. Haskell and R. L. Schmidt in "The Bell System Technical Journal", vol. 50, No. 8, October 1975, pages 1475 to 1495;

article by von Gert Bostelmann in "Frequenz", vol. 33, No. 1, January 1979, Berlin, pages 2 to 8; and U.S. Pat. No. 4,027,331.

The internal discrimination criteria in the movement detector are based on the detection of the elements of the visual portion of each frame whose amplitudes or levels have varied in excess of a certain threshold, generally variable in terms of the pel words which may be transmitted, with respect to those of the previous picture elements. The "stationary" areas of the present picture which correspond to amplitude differences below the variable threshold remain unchanged in the frame store, except in the event of interpolation. On the other hand, the moving areas are replenished, i.e. causing the frame store to be filled in lieu of the corresponding areas of the previous frame. It turns out that such criteria are quite suitable for video pictures having relatively restricted displacements in the picture moving areas.

The movement detection threshold drops when the number of modified elements to be encoded and transmitted increases, thus allowing suitable reconstitution in the decoding device of the receiver. It is possible because of the reduced threshold that the encoding must be regulated in order to adapt the variable number of modified element words to be encoded to the constant rate of the digital transmission medium. This regulation is achieved using an "elastic" buffer in which the selected encoded element words are asynchronously written and are read synchronously at the transmission medium rate. If buffer store is never full nor empty, its contents make it possible to determine regulation parameters of the encoder such that the average incoming bit-rate in the buffer store equals that of the transmission medium. Indeed, the number of bits, or more exactly, of the pel words, generally with 4 bits after DPCM encoding, is variable from frame to frame. For each frame, DPCM words representing the amplitudes of the variable picture elements, as well as the start and end address words of the clusters of these variable elements, are thus transmitted. When the buffer store overflows, due to significant variable element clusters being imminent, temporal subsampling of every second field and/or spatial subsampling of one pel out of two for each line systematically occurs (modes 1 and 2 according to the afore-mentioned article by Haskell and Schmidt). In the first above mode, the missing field assumed to be an even numbered field, is not transmitted by the transmitter and is replaced at the receiver by a field resulting from an interpolation of the two previous and upcoming adjacent odd numbered fields, thus reducing the vertical resolution of the picture by a factor of two. In the second mode, the untransmitted pels are obtained from their transmitted adjacent elements by interpolation.

Conditional replenishment encoding and decoding systems, such as these, present the following drawbacks:

the optimization and the production of the encoding device are complex as a result of the various operating modes depending on the fullness of the "elastic" buffer store and consequently on the movement;

multiplexing in the digital transmission medium of a variable member of element and element cluster address data words and, therefore, which results in variable duration for the transmitted pel words for each picture;

as a result of the variable number and duration of the transmitted pel words for each picture, the receiver must include resynchronizing means employing variable lock on the transmitted synchronization words and an "elastic" buffer store analogous to that at the transmitter;

in the event of significant movements, reduction of the temporal or spatial resolution is reduced by spatial or temporal subsampling.

To avoid the interpolation problems according to the conditional replenishment, Amano et al., U.S. Pat. No. 3,940,555 discloses encoding of a picture signal for which all the variable MICD encoded level words representative of pel level exceeding a predetermined threshold are transmitted at a low rate digital signal, wherein the number of bits allocated to each "line" of the low rate digital signal is constant. Encoding is an intra-image encoding. Each MICD word indicates the difference between the levels of a present picture element of a horizontal, vertical or diagonal line and the corresponding present picture element of an adjacent line of same type.

The bit number allocated to each line is composed of a line synchronization word, an addressing bit for each pel of the line, the state of which indicates the presence or absence of a change on the pel level, and MICD level words corresponding to changed pels. The bit number of MICD words is always less than or equal to a predetermined integer, such as four, as so as to fit the number of DPCM words to be transmitted to the predetermined bit number allocated to each line.

However, this encoding and decoding system has the drawback that the bit number allocated to each line may be reduced to unity, when there are to be transmitted a large number of line pels having levels which are varied. In fact, since an interpolation and, consequently, a subsampling are not provided, the picture spatial resolution is reduced considerably. This encoding and decoding system is used when the ratio between the outgoing and incoming binary rates is relatively low, such as ¼.

OBJECTS OF THE INVENTION

It is therefore an object of this invention to provide an encoding and decoding system free, in particular, of the complexity of the regulation means, the elastic buffers and the resynchronizing means of the conditional replenishment systems.

Another object of the invention is to allocate to selected pel words of the moving picture parts to be encoded and transmitted on the digital transmission medium a constant duration for each frame which is independent of the variable number of modified elements from one frame to the next.

A further object of the invention is to fix the number of bits allocated to each line in the low rate digital signal.

Yet another object of this invention is to transmit the data relative to the lines in synchronism with the line frequency, thereby to eliminate element cluster addressing problems. The qualities of the reconstituted picture at the receiver are totally comparable with those of known conditional replenishment systems.

SUMMARY OF THE INVENTION

According to the aforementioned objects of the present invention, there is provided an encoding device comprising:

picture storing means for storing the transmitted picture element words after the words have been interpolated;

means for detecting a moving area of the present picture with respect to the previous stored picture in response to a comparison of the word difference between two words representative of two corresponding elements of the present picture and the previous stored picture with a predetermined threshold;

the number of data bits NB allocated to each line of a picture in said digital transmission medium is constant and the average number of bits $\overline{B}$ allocated to each encoded signal word of a line is greater than or equal to a first predetermined integer;

said moving area detecting means producing, for each line, a picture the coordinates of two ledge picture elements defining the moving area of said present picture with respect to the corresponding line of said for deducing the number NP of picture elements in said moving area of the line likely to be encoded from the produced coordinates of said two ledge picture elements and for deducing said average number of bits B for said line from the ratio NB/NP of said numbers NB and NP;

a linear predicting means for delivering DPCM predicted picture element word from the stored picture element words and present picture element words;

first and second down-counting means controlled by said movement area detecting means respectively have counts $C_1$, and $C_2$, set to NB and NP at the start of the moving area of each present picture down-count the number of bits remaining to be allocated to said line and the number of picture element words remaining likely to be encoded at the line element frequency;

the counts of said first and second down-counting means are compared to select the DPCM words representing the picture element to be transmitted into each time $C_1/\overline{B} \leq C_2$;

said selected DPCM words are encoded, according to a predetermined quantization law, to multiplex said selected DPCM words in said digital transmission medium; and in response to the encoded DPCM words the PCM unselected picture element words are linearly interpolated.

Generally speaking, in order to reduce the data quantity to be transmitted, the encoding means of the encoding device transmits on the digital transmission medium a $\overline{B}$-bit PCM word representing the quantification level number rather than the amplitude of the DPCM quantization level of each selected modified element. Two identical decoding means are included in the transmitter encoding device, and the receiver decoding device respectively, and restore a word representative of said level so that the transmitter and receiver frame stores store identical words for each pel of the moving area of a line after interpolating and low-pass filtering, if required. In accordance with a first embodiment of the encoding device, means are provided for calculating the maximum DMAX and average $\overline{D}$ values of the DPCM encoded words of all the elements in the moving area of a line such that the DPCM encoding means selects a $2\overline{B}$ level quantization law peculiar to the moving area of the line. This enables the variation characteristics of the incoming video signal to be reduced as much as possible. A quantization law associated with a line may be reconstituted in the decoding device of the receiver, since $\overline{D}$ and DMAX are included in the data preamble which is assigned to the line and which precedes the selected level words of the line. In accordance with a second embodiment, which is less complex than the first embodiment, the level numbers of a plurality of quantification laws are stored in the encoding means of the encoding device. For each line, a stored quantification law is selected as a function of the average number $\overline{B}$ allocated to selected and transmitted level words of the line.

BRIEF DESCRIPTION OF THE DRAWING

The foregoing and other objects, features and advantages of the invention will be apparent from the following detailed description of the preferred embodiments of the invention as illustrated in the accompanying drawings, in which:

FIG. 2 is a block diagram of the encoding device of the transmitter according to the first embodiment and partly to the second embodiment;

FIG. 5 is a detailed block diagram of the arithmetic unit for calculating DMAX and $\overline{D}$;

Figure 1:
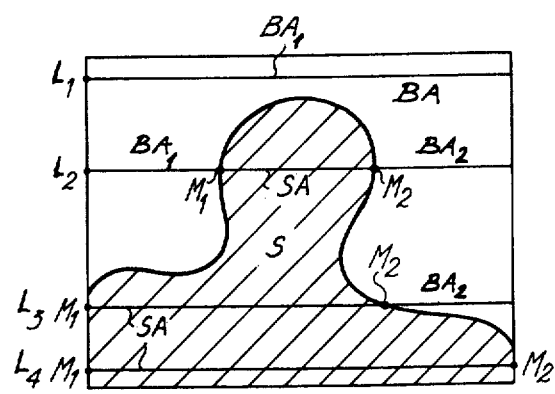
FIG. 1 is a schematic diagram showing the moving area of a picture displayed on the screen of a videotelephone.

Reference is made in this description to a standard videotelephone, the functional features of which are as follows:

Definition of a picture displayed by a videotelephone:
313 lines, 288 of which are used for the visible picture portion and 25 of which are allocated to the field (or half-frame) synchronizing and blanking signal;
each line contains 284 elements, 53 of which are allocated to the line synchronizing and blanking signal and 231 of which are visible picture elements (pels);
frequency of the field synchronizing signal equals 50 Hz i.e. 25 frames per second with two interlacing frames;
frequency of the line synchronizing signal equals 7.825 kHz;
frequency of the elements equals $7.825 \times 284 = 2.2223$ MHz.

After a transmitter encoding device samples the video signal transmitted by the camera of the videotelephone, the encoding device receives a digital signal having a frequency of $8 \times 2.2223 = 17.778$ M bits/s. Each element in the digital signal is sampled over 256 levels between white (1 volt) and black (0.3 volts) and has a time-slot $\tau = 450$ nsec corresponding to an 8-bit word.

After encoding the video digital signal is conveyed i.e., transmitted, on a digital link connected to the output of the transmitter in accordance with international recommendations, the video digital signal is of the TNI type. The video digital signal has a rate of 2.048 Mbits/s. The transmitter derives a repeating frame having 32 eight-bit bytes (octets), having time intervals TI0 and TI16 reserved, inter alia, for frame alignment, signaling and stuffing indication purposes. An 8-bit time interval of the link frame is allocated to a 64 kbit/s digital channel which conveys the additional data such as the sound. Consequently, 29 time intervals in a 2.048 Mbit/s digital frame are occupied by the video signal produced by the transmitter, so that a video bit-rate at the output of the transmitter equals:

$$2.048 \times 29/32 = 1.856 \text{ Mbit/s}$$

In accordance with the invention, the encoding device makes it possible to reduce the picture-carrying video signal rate from 17.778 Mbits/s to 1.856 Mbits/s by assigning a constant number of bits, N to each useful line (288 lines form a frame) in the transmitted encoded digital signal; per the foregoing parameters, wherein:

$$N = 1.856 \times 10^6/(288 \times 25) = 258 \text{ bits per picture line}$$

It is assumed in the following that, amongst these 258 bits, the first 27 form a preamble containing words for line synchronization and certain discriminations inherent in the invention-orientated encoding. It follows from this that NB = 258 − 27 = 231 bits remain which are truly allocated to the transmission of the visible portion of a picture line. These NB bits are generally split into words of at least three bits. Each word indicates the amplitude of a particular line element selected in accordance with a DPCM encoding scheme according to the invention, the principle of which is described hereinafter in reference to FIG. 1.

In FIG. 1 is schematically shown the contour of moving picture on a videotelephone screen, such that speaker's (S) face (shaded area) stands out against a fixed background area BA, generally having one color; more exactly having a uniform colorimetric level. Each line is divided into one background area $BA_1$, $BA_2$ or two background areas $BA_1$ and $BA_2$ and/or a central or lateral area SA which is essentially moving and represents the moving speaker S or the suddenly uncovered background. Each background area BA varies from one frame to the next only in terms of camera noise. In this way, for lines $L_1$, $L_2$, $L_3$ and $L_4$ respectively above speaker area S, at the speaker's face level, at the speaker's neck level and at the speaker's shoulder level, as shown in FIG. 1, the area distribution is given by Table I below:

TABLE I

| Area | $BA_1$ | SA | $BA_2$ |
|---|---|---|---|
| line $L_1$ | fixed | empty | empty |
| line $L_2$ | fixed | moving | fixed |
| line $L_3$ | empty | moving | fixed |
| line $L_4$ | empty | moving | empty |

For each line, these areas are marked off by two picture elements $M_1$ and $M_2$ having abscissae $X_1$ and $X_2$ more precisely, the moving area SA of the speaker pictures is defined with respect to the background BA by pairs of elements $M_1$, $M_2$. Since the video signal representative of the background has a constant amplitude variation on each line, only the pels on picture area SA are of interest when reproducing the picture in the videotelephone system receiver. For example, the area $M_1 M_2$ of line $L_2$ is small, the area $M_1 M_2$ of line $L_3$ occupies the major portion of the left hand side of the screen and the area $M_1 M_2$ of line $L_4$ occupies the whole screen. Since the number of bits NB allocated to a line is constant, the encoding device transmits the frame data of line area $M_1 M_2$ by reducing the real contents of this received data to 8-bit words at 17.778 Mbits/s in accordance with certain criteria which are based, on one hand, on the temporal redundancy of the frame or handling only those frame areas which are moving and, on the other hand, on the spatial redundancy with a view to cut down the range of the transmitted signal by differential pulse coding (DPCM).

The various transmitter encoding device circuits are illustrated in FIG. 2 and are described below in the processing of the 17.778 Mbit/s digital video signal derived from the camera and the associated sampler.

The encoding device essentially comprises a frame store 1 which memorizes the odd field followed by the even field of the same frame, a movement detector 2, a bit distributing circuit 3, a linear predictor 4, an arithmetic unit 5 which derives digital signals representing the values DMAX and D which characterize the reduction of the incoming video signal, a PCM encoder 6, a PCM decoder 7, an interpolating circuit 8 and a conditional spatial filtering circuit 9. The encoding device further comprises two series connected shift registers (or line delay circuits) $R_1$ and $R_2$, each having 231 × 8 stages, as well as a digital subtractor 41 and a digital adder 42, each having an input connected to the output 40 of the predictor 4. The input I of the encoding device receives only the 8-bit words P (F, L) at a rate of 17.778 Mbits/s; words P(F,L) represent the 231 visible elements of a line L of a frame F. Filtering and separating means (not shown) connected upstream of the input I separate the video information from the frame and line synchronizing and blanking information. These devices are well known in prior art and are not within the scope of this invention. Likewise, the multiplexing and transmitting circuits connected to the outputs of the encoding device to form the 2.048 Mbit/s outgoing digital signal are not described. In addition, the various links depicted on the drawings are bus-bar simple connections and the logic circuits referred to by function generally comprise a number of such elementary circuits in parallel. The numerical references at the inputs and outputs of blocks in FIG. 2 (and FIG. 13) designate terminals or input or output components which may appear in corresponding detailed block diagrams of other figures.

First, to process the area of the moving picture relating to a line L, the above-defined elements $M_1$ and $M_2$ must be detected. Elements $M_1$ and $M_2$ are detected by movement detector 2, shown in FIG. 3. In detector 2, a digital subtractor 20 receives at its minimal input (+) the signal at input I, representing a pel word P (F, L) of a line L in the frame F to be processed; the subtrahend input (−) of the subtractor responds to a pel word P (F − 1, L) of the line L of the preceding frame (F − 1), as derived from output 10 of the frame store 1.

in accordance with the invention, movement detection is based on an element-to-element comparison of the edge zones at elements $M_1$ and $M_2$ (FIG. 1) between the frame (F) being received at the input I and random access (RAM) previous frame (F − 1) stored in the frame store 1. In this respect, the frame store 1 (FIG. 2) stores all the pel words P'(F, L) of a frame, i.e. 288 × 231 8-bit words. These words P'(F, L) are formed after encoding, seen hereafter. The store 1 includes 34 modules with a capacity equal to 16 kbits. Data are written in and read out of store 1 over a period which is substantially less than the time slot occupied by a pel word P (F, L). In the drawings, there is no illustration of the encoding device time base source which delivers the various monitoring signals peculiar to the monitoring component circuits 1 to 9; such a source is by a clock, such as phase locking loop set at a line frequency of 7.825 kHz.

Each element P (F, L) of the present frame F and the corresponding element P' (F − 1, L) of the previous frame (F − 1) are transmitted into two buffer registers 210 and 220 (FIG. 3) of the movement detector 2. Buffer registers 210 and 200, responsive to signal I and the signal of output terminal 10 of frame store 1, supply signals to the + and − inputs of subtractor 20, respectively. The output of the subtractor 20 provides a word representative of difference P (F,L) − P'(F − 1, L); the difference word is applied to the inputs of two arithmetic units 211 and 221. Arithmetic unit 211 transmits a word indicating the absolute value of the difference $|P(F, L) - P'(F-1, L)|$ to one of the inputs of a digital comparator 23, having another input which receives a threshold signal T. This therehold T is, for example, equal to the gap between two or three successive levels of the 256 (each level having the same amplitude range) corresponding to the sampling of the incoming video signal. If $|P(F, L) - P'(F-1, L)| \geq T$, the output of comparator 23 is in state "1" and is in state "0" otherwise. Arithmetic unit 221 delivers a "1" if the difference $[P(F, L) - P(F-1, L)]$ is positive and a "0" otherwise. The outputs of comparator 23 and arithmetic unit 221 are connected to AND gates 213 and 223 respectively, each having three inputs. Inputs 214, 224 of an AND gates 213, 223 are respectively directly connected to the outputs of the comparator 23, and of the unit 221. The second and third inputs of gates 213 and 223 are reconnected to inputs 214 and 224 via one delay lines 215 and 225, two delay lines 215, 216 and 225, 226, respectively. Each of delay lines 215, 216, 225, 226 introduces a delay equal to $\tau$ and ensure that the amplitude of three consecutive elements of a line of the present frame have fluctuation with a magnitude difference greater than the threshold T; the fluctuations have the same sign with respect to the corresponding elements of the previous frame (F−1). If the sign is positive, the output of the AND gate 223 applies a "1" to one input of AND gate 26. If the sign is negative NOR gate 24, having three inputs connected in parallel to those of the AND gate 223, applies a "1" to the above input of the gate 26. The two inputs of AND gate 26 are connected to the outputs of the AND gate 213 and OR gate 25, in turn connected to the outputs of AND gate 223 and NOR gate 24. In this way, detection of the element $M_1$ is indicated by the output of the AND gate 26 being at state "1" at the start of the line processing operation. Detection of element $M_2$ is indicated after the transmission of the other moving-picture elements of the major portion of the area SA (FIG. 1) which is modified beyond the threshold T from one frame to the next, by the output of the AND gate 26 reverting to state "0". The criterion implicated in movement detector 2 is thus based on detecting the displacement of the transition or contour between the areas $BA_1$ and $BA_2$ in one instance and the area SA in another, namely on the inter-frame difference in the amplitudes of the moving elements. This criterion also distinguishes the moving elements from camera noise by choosing a suitable value for threshold T.

The output of the AND gate 26 is connected to a logic circuit 27 which derives signals representing the coordinates $X_1$, $X_2$ of the detected elements $M_1$ and $M_2$. The circuit 27 comprises two monostable flip-flops 271 and 272, having inputs respectively connected directly and via an inverter 270 to the output of the AND gate 26. The outputs of the flip-flops 271, 272 are connected to two AND gates 273 and 274. The other inputs of the AND gates 271, 274 are connected to the output of an element counter 277. This counter 277 is triggered after the end of the line synchronizing signal following the first 53 elements and is reset to zero; the contents of the counter are held or frozen after the 231st element following the first 53 elements. The output signal of the counter 277 thus represents the successive coordinates 1 to 231 of the line elements. Buffer registers 275 and 276, respectively connected to the outputs of the AND gates 273 and 274, store the signal representing the $X_1$ and $X_2$ coordinates of the detected elements $M_1$ and $M_2$.

As described infra, the detection of elements $M_1$ and $M_2$ by means of the movement detector 2 is performed over a line transmission period equal to 1/7.825 second. Throughout this detection process, the 231 8-bit pel words P (F, L) of the line L are delayed in series in the first shift register $R_1$ connected to the input I. Reading of the $X_1$ and $X_2$ coordinates from the registers 275 and 276 is controlled at the beginning of the following line L+1 received at the input I. The various delays lasting one line L or two lines 2L for carrying out the various operations inherent in the encoding are indicated in the drawing by blocks representing line synchronizing signal delay circuits.

Figure 4:
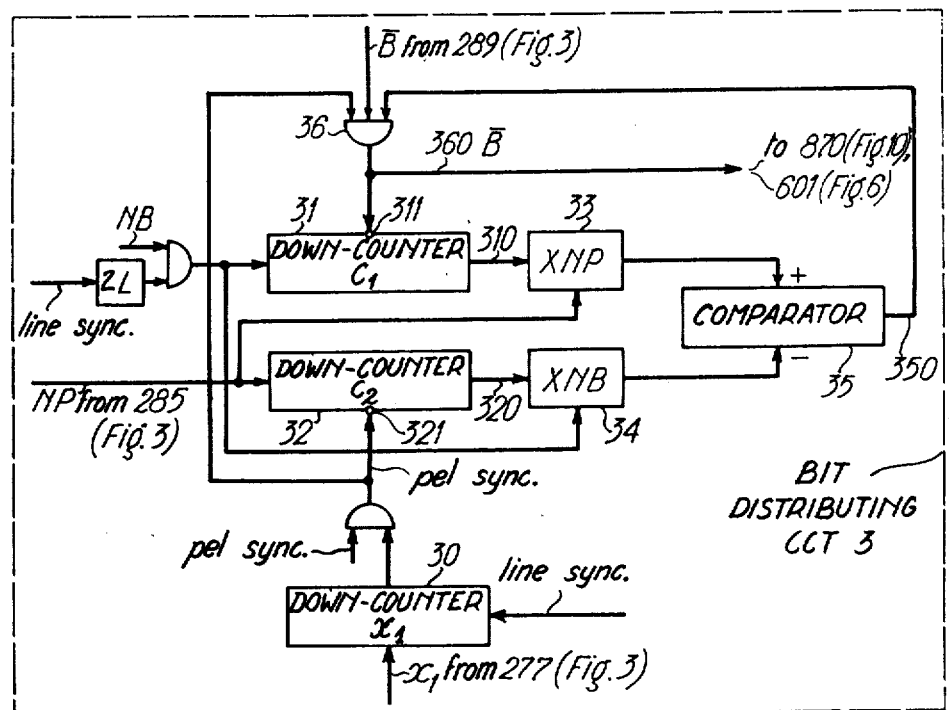
FIG. 4 is a detailed block diagram of the bit distributing circuit which selects the changed pel to be transmitted.

Referring now to FIG. 4, bit distributing circuit 3 delivers, upon reception of the second next line L+2 at the input I, the average number of bits $\overline{B}$ allocated to each pel of line L to be transmitted. In accordance with distribution criteria this circuit selects the elements to be transmitted in order to adapt the 17.778 Mbits/s incoming rate to the 1.856 Mbits/s outgoing rate, i.e., the real rate of 2.048 Mbits/s after multiplexing. The distribution criteria are as follows:

(a) each pel to be transmitted is so indicated by a word having at least three bits, to obtaining a DPCM encoding process having adequate picture qualities in the receiver; the number of bits in a transmitted pel word is preferably restricted by a high limiting value equal to six for instance;

(b) since the pass band frequency is reduced in the moving area SA (FIG. 1), due in particular to the blurring inherent in camera integration subsampling of the moving elements can be performed; in other words, certain elements of a line in area S are neither encoded nor transmitted and are reconstituted upline of the frame store, both in the transmitter encoding device (FIG. 2) and in the receiver decoding device (FIG. 13) by means of interpolating circuit 8 and filtering circuit 9;

(c) when the total number of bits $NP \times \overline{B}$ of the NP pel words in the SA area is less than the number of bits NB reserved for a line, i.e., when the SA area or $X_2 - X_1$ is very small, then abitrary filling bits and/or eventually additional data words, such as pel PCM words, can be mixed with the $NP \times \overline{B}$ bits to come up to NB bits.

Bit distribution and sample selection mainly depend on the width of the area SA equal to $X_2 - X_1$ on the line L. The movement detector 2 shown in FIG. 3 includes an arithmetic unit 28 which calculates the number of elements NP of the SA area lying between $M_1$ and $M_2$, including the latter unit 28 also calculates the average number of bits $\overline{B}$ to be assigned to each element to be transmitted. Under control of the synchronizing signal of the following line L+1 the pel word transfer from register $R_1$ to register $R_2$ prior to the start of line L, (FIG. 2), the $X_1$ and $X_2$ coordinates are read in the registers 275 and 276 via AND gates 281 and 282. The $X_1$ and $X_2$ coordinates are respectively transmitted, on the one hand, to inputs 510 and 520 of the arithmetic unit 5 (FIG. 5); the $X_1$ and $X_2$ are also supplied to the subtrahend (−) and minuend (+) inputs of a digital subtractor 283, respectively. The difference $(X_2 - X_1)$ output of subtractor 283 is added to unity in an adder 284 to deliver a signal representing $X_2 - X_1 + 1 = NP$ that is supplied to a register 285 and to the input of an divide-by-NB divider 286. The divider 286 performs the integer division=integer part (NB/NP)=$\bar{b}$= average number of bits. The signal number b representing delivered by the divider 286, is compared with three and six in a comparator 287. If $6 \geq \bar{b} \geq 3$, then an output $287_1$ of the comparator 287 enables AND gate 2880 whereby signal $\bar{b}$, representing the number of bits allocated to each pel after encoding, such that $\bar{b}=\bar{B}$, is coupled from the output of the divider 286 to a register 289, via an OR gate 2881. If $\bar{b}<3$, then an output $287_3$ of the comparator 287 applies the lower limiting integer value of the average bit number $\bar{B}$, equal to 3, to the register 289 via the OR gate 2881. Finally, if $\bar{b}>6$, then an output $287_6$ of the comparator 287 applies the upper limiting integer value of the average bit number $\bar{B}$ equal to 6 to the register 289 via the OR gate 2881.

The bit distribution circuit 3 shown in FIG. 4 comprises two down-counters 31 and 32 which have their counts initially set to NB and NP respectively by reading a read-only memory (not shown) and the register 285 (FIG. 3) controlled by the line synchronization signal. The count of a down-counter 30 is also initially set to $X_1$ by reading the register 275 (FIG. 3) so that, once the count of counter 30 reaches zero, the counter triggers counting in down-counters 31 and 32 at the element frequency $1/\tau$, simultaneously with the series transmission of the pel words P (F, L) of the line L from register $R_2$ to the input 600 of the encoder 6 via the subtractor 41 (FIG. 2). The counts in down-counters 31 and 32 are delivered on output buses 310 and 320, at the element frequency of $1/\tau-2.2223$ MHz, to two digital multiplying circuits 33 and 34, where the counts are multiplied by NP and NB, respectively. The outputs of the circuits 33 and 34 are connected to the minuend (+) and subtrahend (−) inputs of a digital comparator 35. When the difference of the compared words in the comparator 35 is positive, the comparator output 350 is in state "1" to assist in enabling AND gate 36, another input of which receives the average number of bits B transmitted by the register 289 (FIG. 3) during each period $\tau$. Count input 311 of the down-counter 31 is connected to the output of AND gate 36 and down-count input 321 of the down-counter 32 receives a "1" during each period $\tau$ corresponding to the NP elements of moving area SA of the line L.

In the bit distributing circuit 3 shown in FIG. 4 the down-counter 31 counts down the number of available bits remaining to be allocated to the line L and the down-counter 32 counts down the number of remaining bits of moving area SA. The count $C_2$ of the down-counter 32 is successively decremented by unity for each element lying between $M_1$ and $M_2$. The count $C_1$ of the down-counter 31 is reduced by $\bar{B}$ each time output 350 of the comparator 35 is positive, i.e. when $C_1 B \geq C_2$ or $C_1 \times NP \geq C_2 \times NB$ and $C_1 \times NP \geq \bar{B} \times NP$.

When the above inequality is satisfied, the element is sampled, i.e. transmitted, the down-counter 31 is decremented by $\bar{B}$ since the gate 36 applies the word $\bar{B}$ via the bus 360 to down-counting input 311 of the down-counter; simultaneously gate 34 applies word $\bar{B}$ to an input 601 of the encoder 6, which encoders said element into DPCM code. On the other hand, should the above inequality not be satisfied, the element is subsampled, i.e. is reconstituted by interpolation in the interpolating circuit 8 (FIGS. 2 and 10), and AND gate 36 remains closed whereby down-counter 31 is not decremented. The down-counter 32 is always decremented by unity when passing from one element to the next.

Tables II and III contain a simple example of the bit distribution operation for a number NB of available bits per line equal to 20 bits, although in practice this number is higher.

TABLE II

| NB = 20 bits | | | NP = 6 elements | | | | $\bar{b} = 3\ \bar{B} = 3$ |
|---|---|---|---|---|---|---|---|
| line elements | $M_1$ | | | | | $M_2$ | filling bits |
| $C_1 \times NP$ (output of 33) | 120 | 102 | 84 | 66 | 48 | 30 | |
| $C_2 \times NB$ (output of 34) | 120 | 100 | 80 | 60 | 40 | 20 | |
| sampled elements (output 360) | 3 | 3 | 3 | 3 | 3 | 3 | 2 |

TABLE III

| NB = 20 bits | | | | | NP = 11 elements | | | | | | | $\bar{b} = 1$ forced to B = 3 |
|---|---|---|---|---|---|---|---|---|---|---|---|---|
| line elements | $M_1$ | | | | | | | | | | $M_2$ | filling bits |
| $C_1 \times NP$ (output of 33) | 220 | 187 | 187 | 154 | 154 | 121 | 88 | 88 | 55 | 55 | 22 | |
| $C_2 \times NB$ (output of 34) | 220 | 200 | 180 | 160 | 140 | 120 | 100 | 80 | 60 | 40 | 20 | |
| output 360 sampled elements $\bar{B}$ | 3 | 3 | | | 3 | 3 | | 3 | | 3 | | 2 |
| output 360 elements subsampled and reproduced by interpolation | | | 0 | 0 | | | 0 | | 0 | | 0 | |

A description is now given of circuits 4 and 5 for reducing the line resolution of the digital incoming signal.

The linear predictor 4 shown in FIG. 2 is of a known type. The 8-bit predictor pel word PP (F, L) transmitted by the output 40 is obtained by a linear combination of previously transmitted pel words to enable the predictor pel word to be identical at the transmitter and receiver, so as to avoid the transmission of additional data. The prediction is based on the linear combination of the PCM-coded amplitude of predetermined elements which belong to the present frame F (intra-frame prediction) and/or the previous frame F-1 (inter-frame or frame difference prediction). These various predictions are described, for instance, in B. G. HASKELL's article, entitled "Entropy Measurements for Nonadaptive and Adaptive, Frame-to-Frame, Linear-Predictive Coding of Videotelephone Signals", The Bell System Technical Journal, July-August 1975, pages 1155 to 1174. For an element P(F,L) of the frame F on the line L, the corresponding predicted element may be, for example:

$$PP(F,L) = P'(F-1,L) \quad (1)$$

or $$PP(F,L) = (P-1)'(F,L) \quad (2)$$

or $$PP(I,L) = (P-1)'(F,L) + P'(F,L-1) - (P-1)'(F,L-1) \quad (3)$$

or $$PP(I,L) = ((P-1)'(F,L) + (P+1)'(F,L-1))/2. \quad (4)$$

P−1 and P+1 designate the elements coming before and after element P on a line L of a frame F; P′, (P−1)′ and (P+1)′ relate to the values which are obtained after encoding and interpolation, then stored into the frame store 1. The predictor 4 can be of the nonadaptive type, in which case the predictor always carries out the same prediction operation for all elements. The predictor can also be of the adaptive type, in which case it operates for each frame line as per one of the preceding linear predictions in terms of certain criteria, such as the relative movement of the present frame F with respect to the previous frame (F−1). In the latter case, for suitable line reproduction in the receiver, an output 43 of predictor 4 transmits a so-called prediction word PW which indicates the prediction operation selected for the frame line. This word PW is inserted in the 27-bit data preamble assigned to the line in the 2.048 Mbits/s digital link. As shown in FIG. 2, for each pel word P (F,L) of a line L of a frame F transmitted by the output of the second shift register $R_2$, the output 40 of the predictor 4 delivers the corresponding predicted word PP(F,L) in terms of at least one of the words (P−1)′(F,L), (P−1)′(F,L−1) P′(F−1,L) and (P+1)′(F,L−1) which is delivered from the output 11 of the frame store 1. The digital subtractor 41 applies the difference word such as DP(F,L) = P(F,L) − PP(F,L) to the input 600 of the encoder 6.

The encoder 6 of the encoding device quantizes the digital differential signal DP(F,L) with respect to a number of quantization levels NQ; the number of levels depends upon the number of bits $\bar{B}$ allocated to each sampled element of a common line L by the bit distributing circuit 3. In fact, the encoding from the encoder 6 is based on the absolute value |DP(F,L)|, where the values corresponding to DP (F,L)<0 are obtained by symmetry. The quantization levels are distributed, as shown below, right across the variation range of the incoming differential signal DP(F,L) for the moving area SA of a line L.

The maximal and average values of the incoming differential signal DP (F,L) for a line L are designated by DMAX (L) and $\bar{D}$ (L) such that:

$$DMAX(L) = \text{Max } |P(F,L) - PP(F,L)|$$

$$M_1 \leq P \leq M_2$$

$$\bar{D}(L) = \frac{1}{NP} \sum_{P=M_1}^{P=M_2} |P(F,L) - PP(F,L)|$$

For the quantization level number NQ=$2^{\bar{B}}$, the encoder 6 equally distributes the levels on a so-so basis over the [−$\bar{D}$,+$\bar{D}$] range and [−DMAX,−$\bar{D}$ [and] $\bar{D}$, DMAX] ranges. Encoding such as this obviates encoder overflow, which is a phenomenon producing drag and visible pin-point flaws.

From the foregoing, encoding of any element selected by the bit distributing circuit 3 calls for prior knowledge, on the one hand, of $X_1$ and $X_2$ and, on the other hand, of DMAX and $\bar{D}$. DMAX and $\bar{D}$ are consequently calculated before they are encoded in the encoder 6 but after calculation of coordinates $X_1$ and $X_2$, since this calculation depends on the latter. The maximum time required for processing a line is 1/7.825 kHz=128 μs and does not permit the successive calculations of $X_1$ and $X_2$, then $\bar{D}$ and DMAX, followed by the encoding.

The various operations preceding the encoding of the line L are carried out simultaneously with the respective encoding of the preceding lines, L−2 and L−1, as indicated in the following Table IV:

TABLE IV

| Calculation of $X_1,X_2$ in 2 (FIG. 3) | Calculation of NP and $\bar{B}$ in 2 (FIG. 3) and calculation of $\bar{D}$ and DMAX in 5 (FIG. 5) | Bit distribution in 3 and encoding-decoding in 6,7 and 8 (FIGS. 6, 7 and 8) |
|---|---|---|
| Register $R_1$ | Register $R_2$ | |
| Line L | Line L − 1 | Line L − 2 |
| Line L + 1 | Line L | Line L − 1 |
| Line L + 2 | Line L + 1 | Line L |

With reference to FIG. 5, the arithmetic unit 5 comprises a circuit 50 for calculating a predicted value PP′(F,L) close to the real predicted value PP (F,L) which is transmitted by the output 40 of the predictor 4. Indeed, in the event of an intra-frame prediction taking into account, for example, the previous element (P−1)(F,L) (preceding predictions 2, 3 and 4), such a previous element can not be provided by the frame store 1, since the previous element is obtained after it is processed in the encoder 6, decoder 7 and interpolating circuit 8. These operations follow the calculation of $\bar{D}$ and DMAX. If such a prediction is selected, the value (P−1)′(F,L) is substituted for the real value (P−1)(F,L) which is transmitted from the output of the first shift register $R_1$ via a delay circuit 500 to an input of a predicting circuit 501 included in the unit 5. Should the prediction be based on the elements P(F,L−1) and (P+1)(F,L−1) of the previous line (L−1) (preceding predictions 3 and 4), then the evaluation of these values is also based on the values supplied to the input I of the encoding device. Indeed, once the value P(F,L) has been transmitted by the output of the register $R_1$, the recorded value P′(F,L−1) to be stored in the frame store 1 is evaluated in encoder and decoder 6-7 or in the interpolating circuit 8. The value (P+1)′(F,L−1), corresponding to the value (P+1)(F,L−1) after encoding or interpolating, is not yet transmitted from the output of the register $R_2$. It follows that, for such predictions, consideration is taken of the real values P(F,L−1) and (P+1)(F,L−1) transmitted from the last and next-to-last stages of the register $R_2$ to two inputs of the predicting circuit 501 respectively. Finally, when the prediction is based on an element such as (P−1)(F,L−1) (intra-frame prediction 3) or an element such as P(F−1,L) (inter-frame prediction 1), then the corresponding values (P−1)′(F,L−1) and P′(F−1,L) obtained after encoding or interpolating are already stored in the frame store 1. These values are transmitted to two other inputs of the predicting circuit 501 from the output 12 of the frame store 1 simultaneously with the transmission of P(F,L) from the output of the register R₁. To recapitulate, the predicted pel word PP'(F,L) delivered from the output of the predicting circuit 501, which is analagous to the predictor 4, is given by the following relations in comparison with the four predictions previously described:

(1) PP'(F,L)=P'(F−1,L) equal to PP(F,L)
(2) PP'(F,L)=(P−1)(F,L) different from PP(F,L)
(3)  PP'(F,L)=(P−1)(F,L)+P(F,L−1)−(P−1)'(F,L−1) different from PP(F,L)
(4) PP'(F,L)=((P−1)(F,L)+(P+1)(F,L−1))γ2 different from PP(F,L)

The different predictions are selected by detecting the PW word which is delivered from the output 43 of the predictor 4 to the predicting circuit 501.

Figure 3:
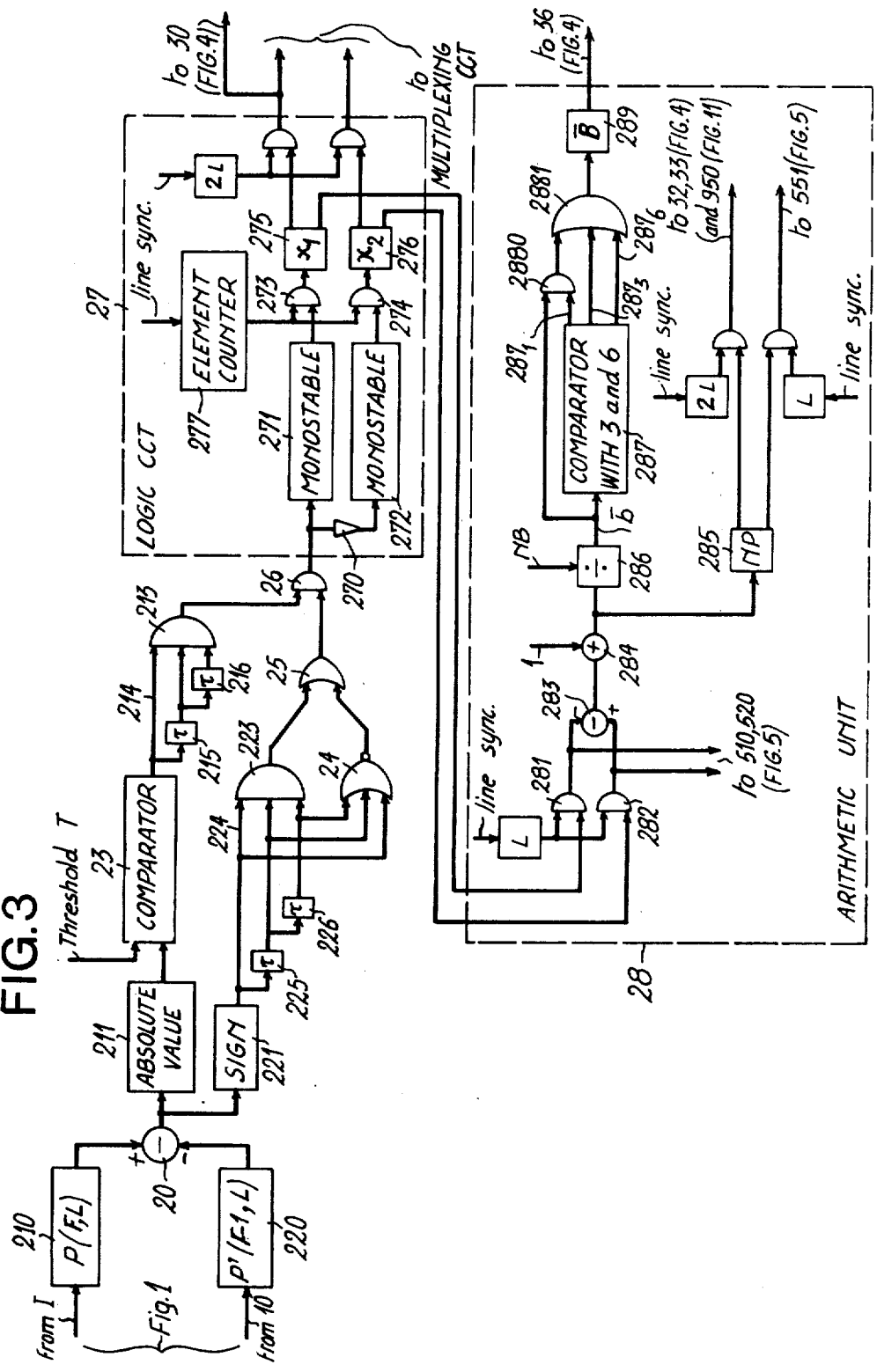
FIG. 3 is a detailed block diagram of the movement detector of the transmitter which includes an arithmetic unit for calculating $\overline{B}$ and NP analogous to that of the decoding device illustrated in FIG. 13.

In the arithmetic unit 5, after the detection of the synchronizing signal related to the line L+1, two down-counters 51 and 52 are decremented by unity during every period time τ. The counts of down-counters 51 and 52 are initially set to the X₁ and X₂ values which are transmitted to their inputs 510, 520 from the registers 275 and 276 via AND gates 281 and 282 (FIG. 3). As long as the count in the down-counter 51 is not zero, its output 511 remains in state "0" to disable AND gates 502, 503, 504, 505 and 506 via an AND gate 507. These gates 502 to 506 respectively responds to the values P (F,L) from the output of the register R₁, (P−1)(F,L) from the output of delay line 500, (P+1)(F,L−1) from the next to last stage of the register R₂, P(F,L−1) from the last stage or output of the register R₂ and P'(F−1,L) and (P−1)'(F,L−1) from the output 12 of the frame store 1. The outputs of gates 502-506 are supplied to the inputs of predicting circuit 501 when the outputs 511, 521 of the down-counters 51, 52 are in state "1", as indicated by a binary one output of AND gate 507. The count in the down-counter 51 is then equal to zero and the count in the down-counter 52 is less than or equal to X₂ after the transmission of pel word representative of the element M₁ from the output of the register R₁. The predicting circuit 501 therefore delivers the predicted words PP'(F,L) which correspond to all the elements lying between M₁ and M₂ of each line L.

The predicted value PP'(F,L) is applied to one of the inputs of a subtractor 53, the other input of which receives the actual value P(F,L) from the output of the AND gate 502. The absolute value |P(F,L)−PP'(F,L)| is transmitted by the subtractor 53 to be added in an accumulator 55 to the sum of the absolute values which have been previously calculated for the elements M₁ to O−1. The absolute value |P(F,L)−PP'(F,L)| is also compared in a comparator 56 with the value of the previously-received absolute values. When the count in the down-counter 52 is equal to zero, which corresponds to the transmission of the element corresponding to the element M₂ by the output of the register R₁, the output 521 of this down-counter enables, via inverter 522, AND gates 550 and 560 which deliver signals representing the following values:

$$\overline{D} \times NP = \sum_{P=M_1}^{P=M_2} | P(F,L) - PP'(F,L) |$$

$$DMAX = \text{Max} | P(F,L) - PP'(F,L) |$$

$$M_1 \leq P \leq M_2$$

The average value $\overline{D}$ is obtained by a divided-by-NP divider 551 which is connected to the output of the AND gate 550 and receives a signal representing NP from the register 285 of the movement detector 2 (FIG. 3). The signal representing average value $\overline{D}$ is supplied to memory 57, read during encoding of the present line L; the signal representing $\overline{D}$ is also transmitted to the subtrahend input (−) of a subtractor 58, having a minuend input (+) which receives the value DMAX from the AND gate 560. The subtractor 58 delivers a signal representing DMAX-$\overline{D}$ to a memory 59, also read during the encoding of the line L. The accumulator 55 and comparator 56 are then automatically reset to zero.

Figure 6:
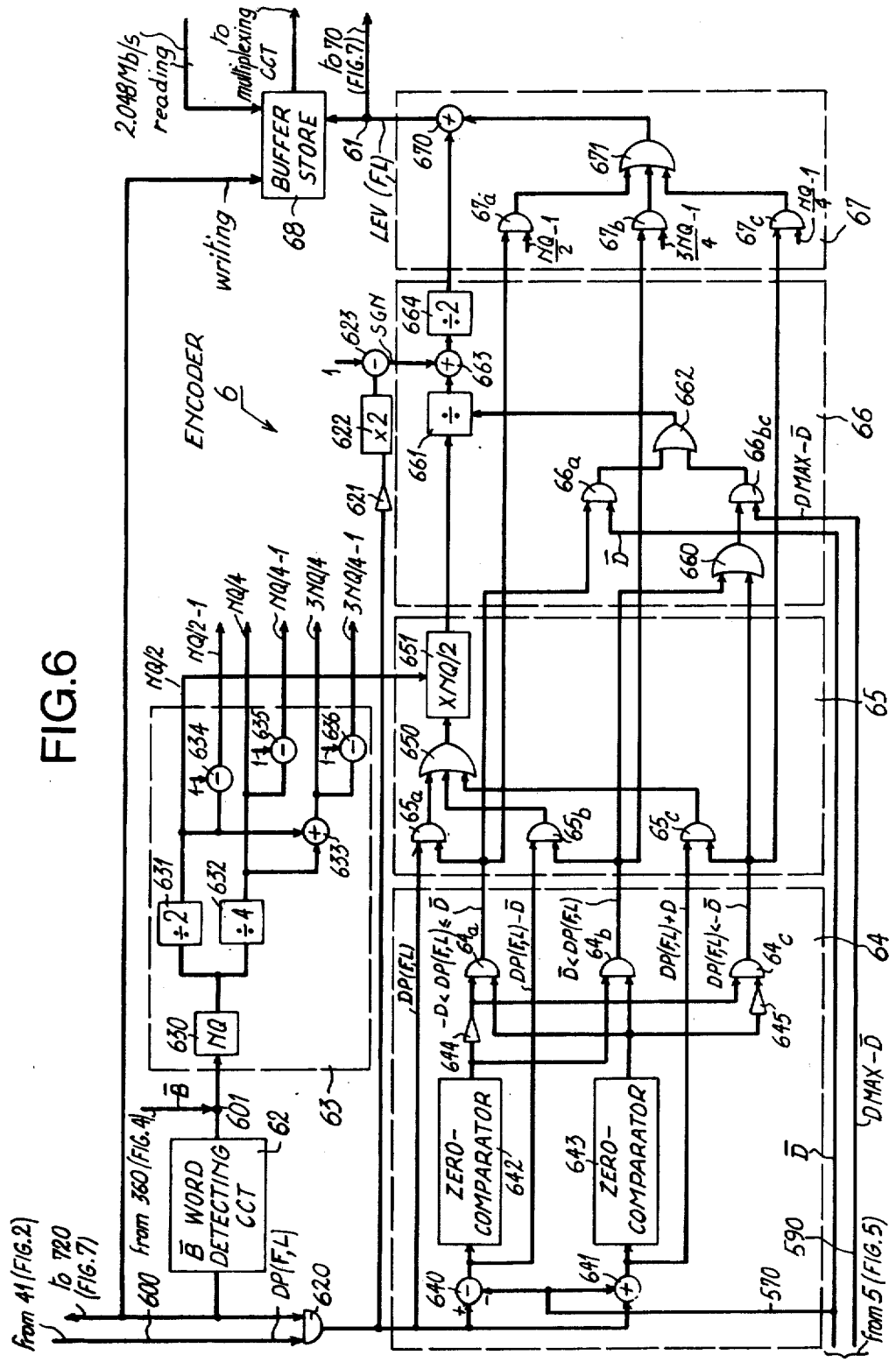
FIG. 6 is a detailed block diagram of the PCM encoder of the transmitter according to the first embodiment.

The output 61 of the encoder 6 shown in FIG. 6 transmits a B-bit binary coded word LEV(F,L) representing the quantization number from NQ=$2^{\overline{B}}$ levels, each time the bit distributing circuit 3 delivers on the output 360 of the AND gate 36 (FIG. 4) the word $\overline{B}$ which indicates the average number of bits to be allocated to a sample word DP(F,L) transmitted by the subtractor 41 (FIG. 2). The word $\overline{B}$ is transmitted to common input 601 of a $\overline{B}$ word detecting circuit 62 and an arithmetic unit 63. The circuit 62 is a 3-comparator which delivers a "1" at its output each time it detects a word such that $\overline{B} \geq 3$. In such a case, the output of circuit 62 enables AND gate 620 of the encoder 6 and AND gate 720 of the decoder 7 (FIG. 7) to select the DP(F,L) samples in 8-bit DPCM code which are delivered to the digital input of the AND gate 620 from the subtractor 41. The DP(F,L) words corresponding to B=0, as indicated in the last line of Table III, for example, are subsampled, i.e. are not coupled through AND gate 620 because gate 620 is disabled by the output of circuit 62 under these circumstances. The DP(F,L) words corresponding to P'(F,L) pel words are deduced by the interpolation process in circuit 8, seen in infra by reference to FIG. 10. The arithmetic unit 63 comprises a calculation module 630 which performs the operation NQ=$2^{\overline{B}}$, a divide-by-2 divider 631, a divide-by-4 divider 632, an adder 633 and subtractors 634, 635, 636, so as to produce signals representing the numbers NQ/2, NQ/2−1, NQ/4, NQ/4−1, 3NQ/4 and 3NQ/4−1 at its six outputs. These integer numbers are used in the calculation of LEV (F,L) by encoder 6 and for derivation of the sample word after decoding DP'(F,L) by decoder 7.

As already stated, the NQ levels are equally distributed half and half into the interval [−$\overline{D}$, +$\overline{D}$] and the double-interval [−DMAX, −$\overline{D}$ [+] $\overline{D}$, DMAX]. The level number NQ is therefore adapted by the encoder 6 to the available bit number NB per line in terms of the numbers of elements NP in the SA area of the line L.

All the logic operations in the encoder and decoder are carried-out with 8-bit words and the output words LEV(F,L) of the encoder have $\overline{B}$ bits for each line respectively, with $\overline{B}$ being greater than or equal to a first predetermined number equal to 3 and less than or equal to a second predetermined number equal to 6. For each sampled element, these operations last less than a time τ. We have assumed for the embodiment of the encoder and decoder illustrated in FIGS. 6 and 7, that the numbers of levels increase in order from 0 - NQ-1 for the levels increasing from −DMAX to DMAX and that the encoding level DP'(F,L) of a sample DP(F,L) is equal to the middle quantization level of the quantization range to which DP(F,L) belongs. Of course, other level distributions and numbering can be chosen, provided the decoders at the transmitter and receiver are identical.

In keeping with the above example, the following relations give, for the three equal distribution intervals of the levels, the level number LEV(F,L) as a function of the sample DP(F,L) in DPCM code and the value of the corresponding sample DP'(F,L) in DPCM code after quantization as a function of LEV (F,L); SGN designates the sign of DP(F,L), i.e. +1 when DP$\geq$0 and −1 when DP<0 and the results of the divisions are rounded off to be integral when $-\overline{D} \leq DP \leq \overline{D}$ then $\frac{NQ}{4} \leq LEV < 3\,NQ/4$  (a)

$$LEV = \left[\left(DP \times \frac{NQ}{2} \times \frac{1}{\overline{D}}\right) + SGN\right] \frac{1}{2} + \frac{NQ}{2} - 1$$

$$DP' = (LEV - (NQ/2 - 1)) \times \frac{4}{NQ} \times \overline{D}$$

when $DP > \overline{D} > 0$ then $\frac{3NQ}{4} \leq LEV < NQ$  (b)

$$LEV = \left((DP - \overline{D}) \times \frac{NQ}{2} \times \frac{1}{DMAX - \overline{D}} + SGN\right) \frac{1}{2} + \frac{3NQ}{4} - 1$$

$$DP' = \left((LEV + 3NQ/4 - 1) \times \frac{4}{NQ} \times (DMAX - \overline{D})\right) + \overline{D}$$

when $DP < -\overline{D} < 0$ then $0 \leq LEV \leq \frac{NQ}{4}$  (c)

$$LEV = \left((DP + \overline{D}) \times \frac{NQ}{2} \times \frac{1}{DMAX - \overline{D}} + SGN\right) \frac{1}{2} + \frac{NQ}{4} - 1$$

$$DP' = \left((LEV - (NQ/4 - 1)) \times \frac{4}{NQ} \times (DMAX - \overline{D})\right) - \overline{D}$$

The following Tables V and VI indicate the quantization numbers and the corresponding sample values, LEV and DP', which have been calculated as per the above relations for values of $\overline{B}$ such that $\overline{B}=3$ and $\overline{B}=4$.

TABLE V

| ($\overline{B} = 3$, NQ = 8) | | |
|---|---|---|
| DP | LEV | DP' |
| [($\overline{D}$ + 3DMAX)/4, DMAX] | 7 | DMAX |
| [(3$\overline{D}$ + DMAX)/4, ($\overline{D}$ + 3DMAX)/4[ | 6 | (DMAX + $\overline{D}$)/2 |
| [3$\overline{D}$/4, (3$\overline{D}$ + DMAX)/4[ | 5 | $\overline{D}$ |
| [$\overline{D}$/4, 3$\overline{D}$/4[ | 4 | $\overline{D}$/2 |
| ]−$\overline{D}$/4, $\overline{D}$/4[ | 3 | 0 |
| ]−3$\overline{D}$/4, −$\overline{D}$/4] | 2 | −$\overline{D}$/2 |
| [(3$\overline{D}$ − DMAX)/4, −3$\overline{D}$/4] | 1 | −$\overline{D}$ |
| [−DMAX, (−3$\overline{D}$ − DMAX)/4] | 0 | −(DMAX + $\overline{D}$) |

TABLE VI

| ($\overline{B} = 4$, NQ = 16) | | |
|---|---|---|
| DP | LEV | DP' |
| [($\overline{D}$ + 7DMAX)/8, DMAX] | 15 | DMAX |
| [(3$\overline{D}$ + 5DMAX)/8, ($\overline{D}$ + 7DMAX)/8[ | 14 | ($\overline{D}$ + 3DMAX)/4 |
| [(5$\overline{D}$ + 3DMAX)/8, (3$\overline{D}$ + 5DMAX)/8[ | 13 | ($\overline{D}$ + DMAX)/2 |
| [(7$\overline{D}$ + DMAX)/8, (5$\overline{D}$ + 3DMAX)/8[ | 12 | (3$\overline{D}$ + DMAX)/4 |
| [7$\overline{D}$/8, (7$\overline{D}$ + DMAX)/8[ | 11 | $\overline{D}$ |
| [5$\overline{D}$/8, 7$\overline{D}$/8[ | 10 | 3$\overline{D}$/4 |
| [3$\overline{D}$/8, 5$\overline{D}$/8[ | 9 | $\overline{D}$/2 |
| [$\overline{D}$/8, 3$\overline{D}$/8[ | 8 | $\overline{D}$/4 |
| ]−$\overline{D}$/8, $\overline{D}$/8] | 7 | O |
| ]−3$\overline{D}$/8, $\overline{D}$/8] | 6 | −$\overline{D}$/4 |
| ]−5$\overline{D}$/8, −3$\overline{D}$/8] | 5 | −$\overline{D}$/2 |
| ]−7$\overline{D}$/8, −5$\overline{D}$/8] | 4 | −3$\overline{D}$/4 |
| ]−(7$\overline{D}$/DMAX)/8, −7$\overline{D}$/8] | 3 | $\overline{D}$ |
| ]−(5$\overline{D}$ + 3DMAX)/8, −(7$\overline{D}$ + DMAX)/8] | 2 | −(3$\overline{D}$ + DMAX)/4 |
| ]−(3$\overline{D}$ + 5DMAX)/8, −(5$\overline{D}$ + 3DMAX)/8] | 1 | −($\overline{D}$ + DMAX)/2 |
| [−DMAX, −(3$\overline{D}$ + 5DMAX)/8] | 0 | −($\overline{D}$ + 3DMAX)/4 |

Figure 7:
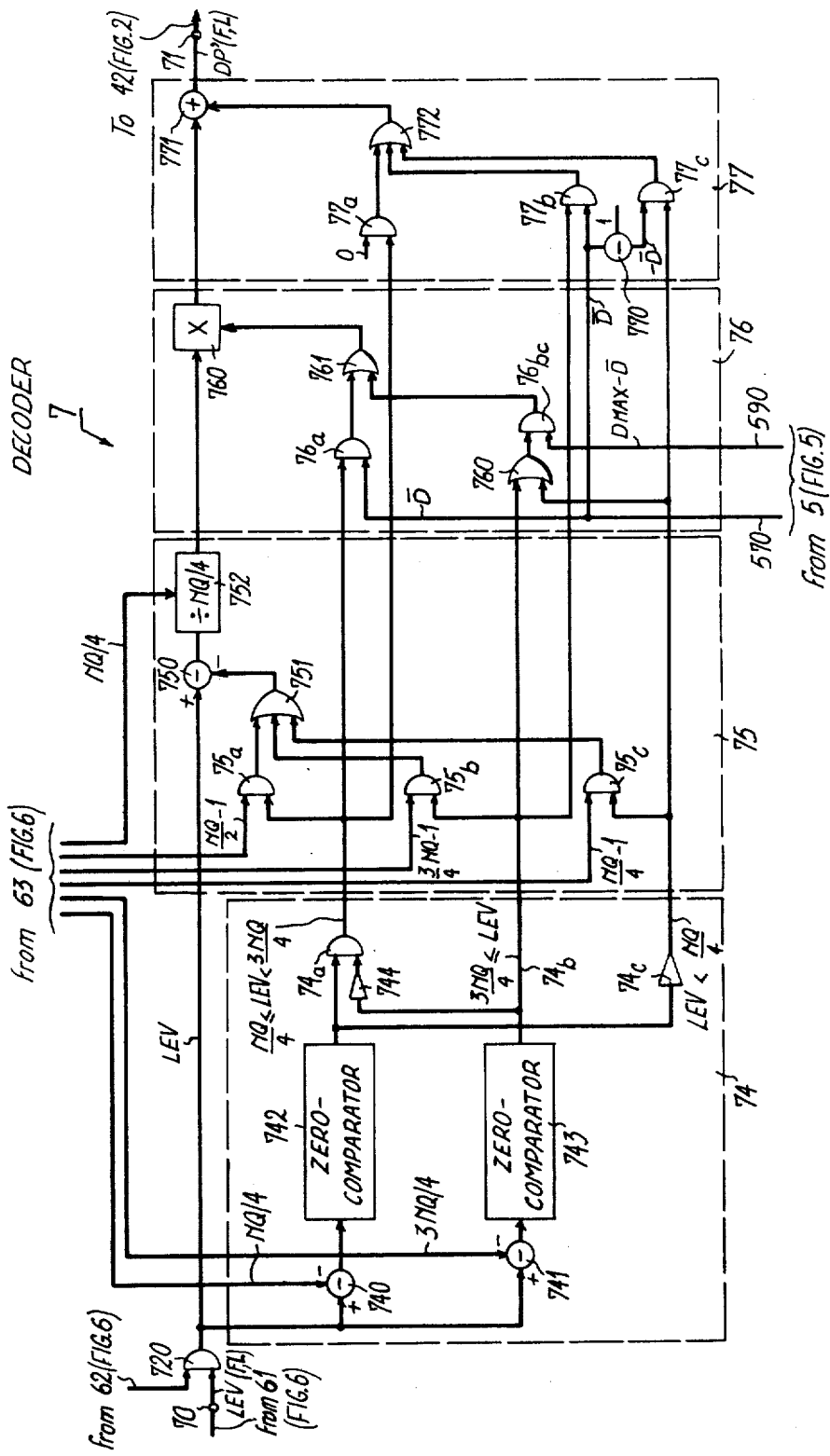
FIG. 7 is a detailed block diagram of the PCM decoder of the transmitter or receiver according to the first embodiment.

As shown in FIG. 6, the encoder 6 comprises a main channel, logic and arithmetic circuits common to the LEV(F,L) calculations in the three above cases a,b,c, and interlinked as per the order of the LEV(F,L) calculation operations. These logic and arithmetic circuits deal first of all with the distinction of the three cases, then a subtraction of DP(F,L), if required, and a multiplication by NQ/2, the division by $\overline{D}$ or (DMAX-D) followed by the addition of SGN and the division by 2, and finally, if necessary, an addition of a factor such a NQ/2−1, 3NQ/4−1 or NQ/4−1. The sign SGN of DP(F,L) is obtained from the following operations on the DP(F,L) sign bit which is "0" when positive, and "1" when negative; viz: negation in inverter 621, multiplication by 2 in multiplier 622 and subtraction of unity in subtractor 623. The circuit assemblies for performing the latter four operations on signal DP(F,6) vis a vis signal D have three digit references with the two most significant digits being 64, 65, 66 and 67, in FIG. 6, respectively. The arithmetic unit 63 delivers signals representing: (1) NQ/2 to the input of a multiplier 651 of the encoder, (2) NQ/2-1 to an input of an AND gate 67a of the encoder and an input of an AND gate 75a of the decoder, (3) NQ/4 to the subtrahend input (−) of a subtractor 740 of the decoder and to an input of a divider 752 of the decoder, (4) NQ/4-1 to the digital input of an AND gate 67c of the encoder and to the digital input of an AND gate 75c of the decoder, (5) 3NQ/4 to the subtrahend input (−) of a subtractor 741 of the decoder, and (6) 3NQ/4-1 to the digital input of an AND gate 6b of the encoder and to the digital input of an AND gate 75b of the decoder. Memories 57 and 59 of the arithmetic unit 5 (FIG. 5) are read at the rate of 1/τ after detection of the synchronizing signal related to line L+2. The memory 57 delivers, via link 570, a signal representing the average value $\overline{D}$ of the DP(F,L) samples to the subtrahend input (−) of a subtractor 640, to an input of an adder 641 and to the digital input of an AND gate 66a of encoder 6 and to the respective digital inputs of AND gates 76a, 77b and 77c of decoder 7 (FIG. 7). The AND gate 77c receives a signal representing −D by means of a unity inverter 770. The memory 59 delivers, via link 590, the difference DMAX-$\overline{D}$ to the digital input of an AND gate 66bc of the encoder and to the digital input of an AND gate 76bc of the decoder.

The logic circuit 64 distinguishes between the three cases (a), (b), (c). Circuit 64 comprises the subtractor 640 and adder 641 having positive inputs connected to the output of the writing AND gate 620; the negative and other positive inputs of subtractor 640 and adder 641 respond to signal $\overline{D}$, as supplied to lead 570 by register 57, FIG. 5. Circuit 64 also includes two zero comparators 642 and 643 which have their respective inputs receiving signals DP(F,L)−$\overline{D}$ from the subtractor 640 and DP(F,L)+D from the adder 641. The outputs of the AND gate 620, subtractor 640 and adder 641 are also connected to the digital inputs of AND gates 65a, 65b and 65c, respectively. When DP(F,L)−D>0 (case b), the output of the comparator 642 is in state "1" and when DP(F,L)+D>0 (cases a amd b), the output of the comparator 643 is in state "1". These two output signals are combined by AND gates 64a, 64b and 64c to control the various calculation operations of LEV(F,L) as per cases a, b and c. The control AND gate 64a includes inputs respectively connected to the outut of the comparator 642 through an inverter 644 and directly to the output of the comparator 643; the output of AND gate 642 is connected to the control inputs of the AND gates 65a, 66a and 67a. The control AND gate 64b has inputs connected directly to the outputs of the comparators 642 and 643 and an output controlling the enabling of the AND gates 65b, 67b and AND gate 66bc; the output of gate 64b controls gate 666c via an OR gate 660. The last control AND gate 64c has inputs respectively connected to the outputs of the comparators 642 and 643 via inverters 644 and 645 to control enabling of the AND gates 65c, and 67c and AND gate 66bc; the latter AND gate is controlled via the OR gate 660. A signal representing either the difference between DP(F,L) and the zero value or $\overline{D}$, or the addition of DP(F,L) to $\overline{D}$ is transmitted from subtractor 640 or adder via a network including comparators 642, 643, inverters 644, 645, gates 64a, 64b, 64c, 65a, 65b, 65c and 650. The word derived from multiplier 651 is divided in amplitude by $\overline{D}$ or (DMAX-$\overline{D}$) in a divider 661, having another input connected via an OR gate 622 to the outputs of AND gates 66a and 66bc. The result of the above division is added to the signal representing SGN in an adder 663 and is then divided by two in a divider 664. The divider 664 is interconnected between the output of the adder 663 and one of the inuts of an adder 670. The outputs of AND gates 67a, 67b and 67c are connected via an OR gate 671 to the other input of the adder 670 such that this adder 670 adds one of the terms NQ/2−1, 3NQ/4−1 and NQ/4−1 depending on the cases a, b, and c, to the output of divider 664. The output of adder 670, common to output 61 of the encoder is transmitted as the level number LEV(F,L) in B-bit pure binary code to input 70 of the decoder 7 (FIG. 7) and, via a buffer store 68, to an input of the transmitter multiplexing circuit (FIG. 2). The buffer store 68 makes it possible to adapt the 17.778 Mbits/s incoming digital rate to the 2.048 Mbits/s outgoing digital rate. With this in mind, the LEV (F,L) words delivered from the output 61 are written under the control of $\overline{B}$ detecting circuit 62 and are read at 2.068 MHz frequency. The capacity of store 68 is equal to NP $_{max}$=NB/3.

Referring now to FIG. 7, the decoder 7 comprises a main channel, including logic circuits 74, 75, 76 and 77 which are used for the calculations of DP'(F,L) as per the three cases a, b and c. Logic circuits 74–77 follow one after the other in the order of the basic operations in the relations given earlier on.

The circuit 74 detects which one of the three cases exists. It comprises the subtractors 740 and 741 and two zero-comparators 742 and 743 having inputs connected to the outputs of the subtractors 740 and 741, respectively. The minimal inuts (+) of the substractor 740 and 741, as well as that of a substractor 750, are connected to the output of the writing AND gate 720, having a digital input 70 which receives the LEV (F,L) word under the control of the output signal from B word detecting circuit 62 (FIG. 6). When NIV≧NQ/4 (case a), the output of the comparator 742 is in state "1". When LEV≧3NQ/4 (case b), output 74b of the comparator 743 is in state "1". The inputs of a first AND gate 74a which controls the calculation of DP'(F,L) according to the case a, are connected directly to the output of the comparator 742 and, via an inverter 744, to the output of the comparator 743. The output of the AND gate 74a is connected to the control inputs of the AND gates 75a, 76a and 77a, the latter having a digital input responsive to a signal representing a zero-value. The calculation of DP'(F,L) according to the case b is controlled directly by output 74b of the comparator 743 which is connected to the control inputs of the AND gates 75b and 77b and, via an OR gate 760, to that of the AND gate 76bc. Finally, the calculation of DP'(F,L), per case c, is controlled by an inverter 74c, the input of which is connected to the output of the zero-comparator 742. The output of the inverter 74c is connected to th control inputs of the AND gates 74c and 77c and, via OR gate 760, to the AND gate 76bc.

A signal representing the difference between LEV(F,L) and the appropriate number NQ/2−1, 3NQ/4−1 or NQ/4−1 is obtained by the subtractor 750, having a subtrahend input (−) which is connected, via an OR gate 751, to the outputs of the AND gates 75a, 75b and 75c. The above difference signal is divided by NQ/4 in the divider 752 which is interconnected between the output of the subtractor 750 and an input of a multiplier 760. This multiplier 760 multiplies the output of divider 752 by a signal representing $\overline{D}$ or (DAMX-$\overline{D}$) which is transmitted to the other input of the multiplier by the outputs of the AND gates 76a and 76bc, via an OR gate 761. The signal resulting from the multiplication is transmitted to an input of an adder 771. The other input of the adder 771 receives a signal representing one of the value O, $\overline{D}$ or $-\overline{D}$ as coupled-through the outputs of the gates 77a, 77b and 7c via an OR gate 772. The output of the adder 771 is common to lead 71 of the decoder 7 and represents the 8-bit DP'(F,L) word fed to the other input of adder 42, shown in FIG. 2. The adder 42 adds DP'(F,L) to the element word PP(F,L) predicted by the predictor 4 in order to transmit PC(F,L)=PP(F,L)+DP'(F,L), which slightly differs from P(F,L) for a sampled element 8DP' ≠0) or is equal to PP(F,L) for a subsampled element (DP' =0) in the direction of the input 13 of the frame store 1, after interpolation and filtering (FIG. 2). This sample value PC(F,L) is so obtained after decoding and is recorded in the frame store 1 to establish the predicted samples of the following line and/or following frame.

The description of FIG. 6 brings to light the fact that the encoder 6 adapts the bit number of the LEV(F,L) word representing the sample to the ratio $\overline{B}$=NB/NP calculated in movement detector 2 (FIG. 3). This number $\overline{B}$ lies between 3 and 6. The multiplexing circuit in the transmitter, upon detection of the synchronizing signal of the L+2 line, multiplexes the words contained in the 27-bit preamble allocated to the line, which words are:

$X_1(M_1)$ and $X_2(M_2)$ delivered from the registers 275 and 276 (FIG. 3), $\overline{D}$ and DMAX−$\overline{D}$ delivered from the memories 57 and 59 (FIG. 5), and possibly the prediction word PW delivered from the output 43 of the predictor 4 (FIG. 2) when the predictor is adaptive.

Then, after detection of the line (L+2) synchronizing signal corresponding to the start of line L sample encoding, the multiplexing circuit receives the sequence of LEV(F,L) words following the preamble via the output 61 of the encoder 6 which, via the buffer memory 68, are read at a bit-rate of 2.048 Mbits/s.

In accordance with a second embodiment, the quantization level numbers LEV(F,L) and the DP'(F,L) values for each distribution of pel words represented by the value of $\overline{B}$ characterizing the moving area SA of a line L are fixed, by being recorded beforehand in two blockks of read-only memories.

Figure 8:
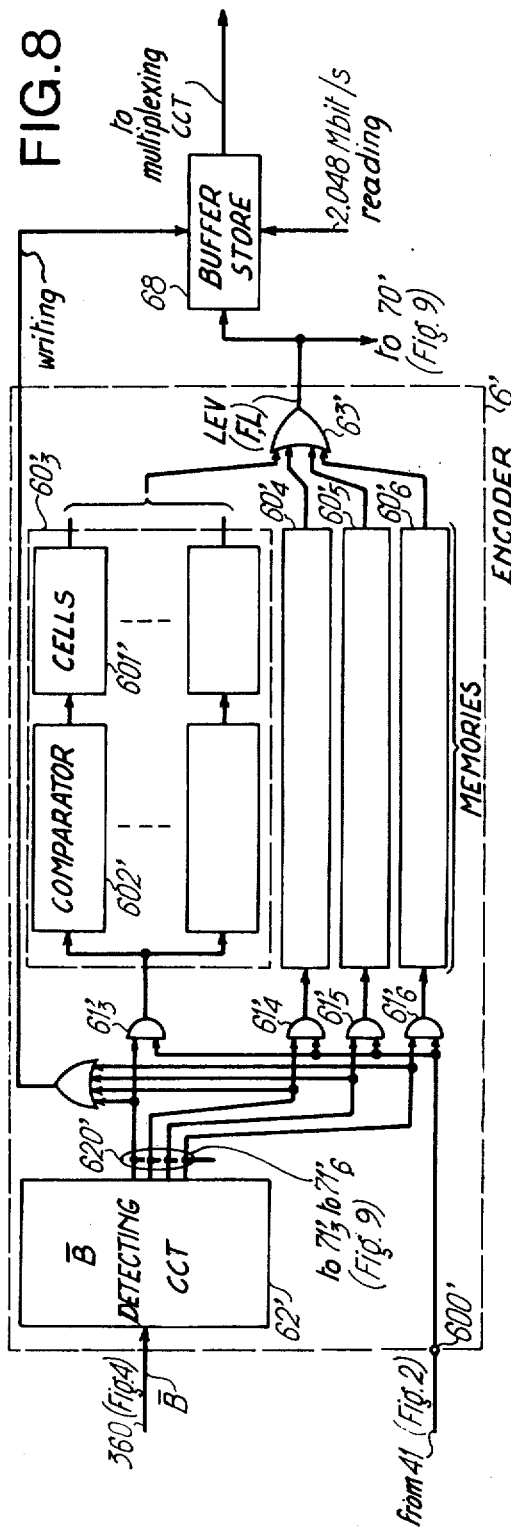
FIG. 8 is a detailed block diagram of the PCM coder of the transmitter according to the second embodiment.

The encoder 6' according to this second embodiment is illustrated in FIG. 8 as comprising four read-only memories $60'_3$, $60'_4$, $60'_5$ and $60'_6$. These memories comprise 8, 16, 32 and 64 memory cells, respectively, each of which stores a quantization level number LEV having 3, 4, 5 and 6 bits, respectively. Each cell of a memory 601' is read and addressed by a comparator 602' which compares the sample word DP(F,L) which is transmitted from the output of subtractor 41 (FIG. 2) to the common digital input 600' of AND read control gates $61'_3$, $61'_4$, $61'_5$, $61'_6$, with the predetermined quantization limiting values corresponding to the LEV(F,L) level. The AND gates $61'_3$ to $61'_6$ are selectively opened by a $\overline{B}$ detecting circuit 62' which receives a signal representing $\overline{B}$ from the bit distributing circuit 3 (FIG. 4), via the output connection 360. The detecting circuit 62' compares $\overline{B}$ with signals representing each of the integers 3, 4, 5 and 6 and, when $\overline{B}$ is equal to one of the preceding integers, controls the opening of the corresponding AND gate $61'_3$ to $61'_6$ via bus 620'. Thus, for each sampled word in DPCM code to be transmitted, one of cells 601' of the memory $60'_{\overline{B}}$ transmits, via an OR gate 63', the $\overline{B}$-bit LEV(F,L) level number word to the each of buffer store 68, the transmitter multiplexing circuit and to the input 70' of the decoder 7' illustrated in FIG. 9.

The decoder 7' comprises four AND gates $71'_3$ to $71'_6$, of each of which is enabled by the output bus 620' of the $\overline{B}$ detecting circuit 62', and four read-only memories $72'_3$ to $72'_6$. The memories $72'_3$ to $72'_6$ respectively comprise 8, 16, 32 and 64 memory cells 720', each of which contains the 8-bit DP'(F,L) quantization level value corresponding to the LEV(F,L) level number stored in the cells of the memory $60'_3$ to $60'_6$ of the encoder 6', respectively. Read-out from memories $72'_3$ to $72'_6$ is respectively controlled by registers $73'_3$ to $73'_6$. Each of registers $73'_3$ to $73'_3$ comprises a zero-comparators and makes the signal representing the LEV(F,L) number transmitted by one of AND gates $71'_3$ to $71'_6$ correspond with the address of associated cell memory 720' with a view to reading the DP'(F,L) content thereof. The DP'(F,L) word corresponding to LEV(F,L) at the input 70' is transmitted, via an output of OR gate 74', by one of the cells of memories $72'_3$ to $72'_6$ to the other input of adder 42 (FIG. 2).

In accordance with this second embodiment, the encoding device no longer comprises the arithmetic unit 5 and the preamble allocated to a line is shorter since it no longer includes the $\overline{D}$ and DMAX words. In other words, the number of available bits NB per line intended for the DPCM encoding of the line elements is greater than for the first embodiment wherein the encoder adapts the quantization levels as a function of the average number of bits $\overline{B}$ per element word. Furthermore, the encoding device in this embodiment now comprises only one shift register Rhd 1, the output of which is connected to the input 600' of the PCM encoder 6' via the subtractor 41. The movement detector 2 calculates $X_1$ and $X_2$ during the reception of a line L in register $R_1$. Then, during the reception of the next line, L+1, the detector 2 calculates NP and $\overline{B}$ and the PCM encoder 6' encodes the DP (F,L) words.

In accordance with another embodiment of this invention, still with a view to increasing the average number of bits $\overline{B}$ per transmitted word, the encoding device receives only every other field at its input I, for example all the even fields. The missing frame field is reconstituted in the decoding device of the receiver by duplication of linear interpolation. In this case, the frame stores of the encoding device (FIG. 2) and the decoding device (FIG. 13) are reduced to field stores, i.e. have a capacity of half that of the one previously described. Moreover the transmitted number of bits N, allocated to each line of the field is twice that of the first embodiment, namely in keeping with the afore-mentioned example N=2×258=516 bits. Amongst these 516 bits, 54 are allocated to the line preamble and NB=462 bits are intended for the encoding of the pel words to be transmitted, i.e. to the LEV level words. For example, for $\overline{B}$=3 bits, 154 LEV(F,L) level words at the most are transmitted for each line. According to this last embodiment, the encoding device operates as has just been described, except that the lines are processed at the rate of 2×7.825=15.650 kHz.

Figure 10:
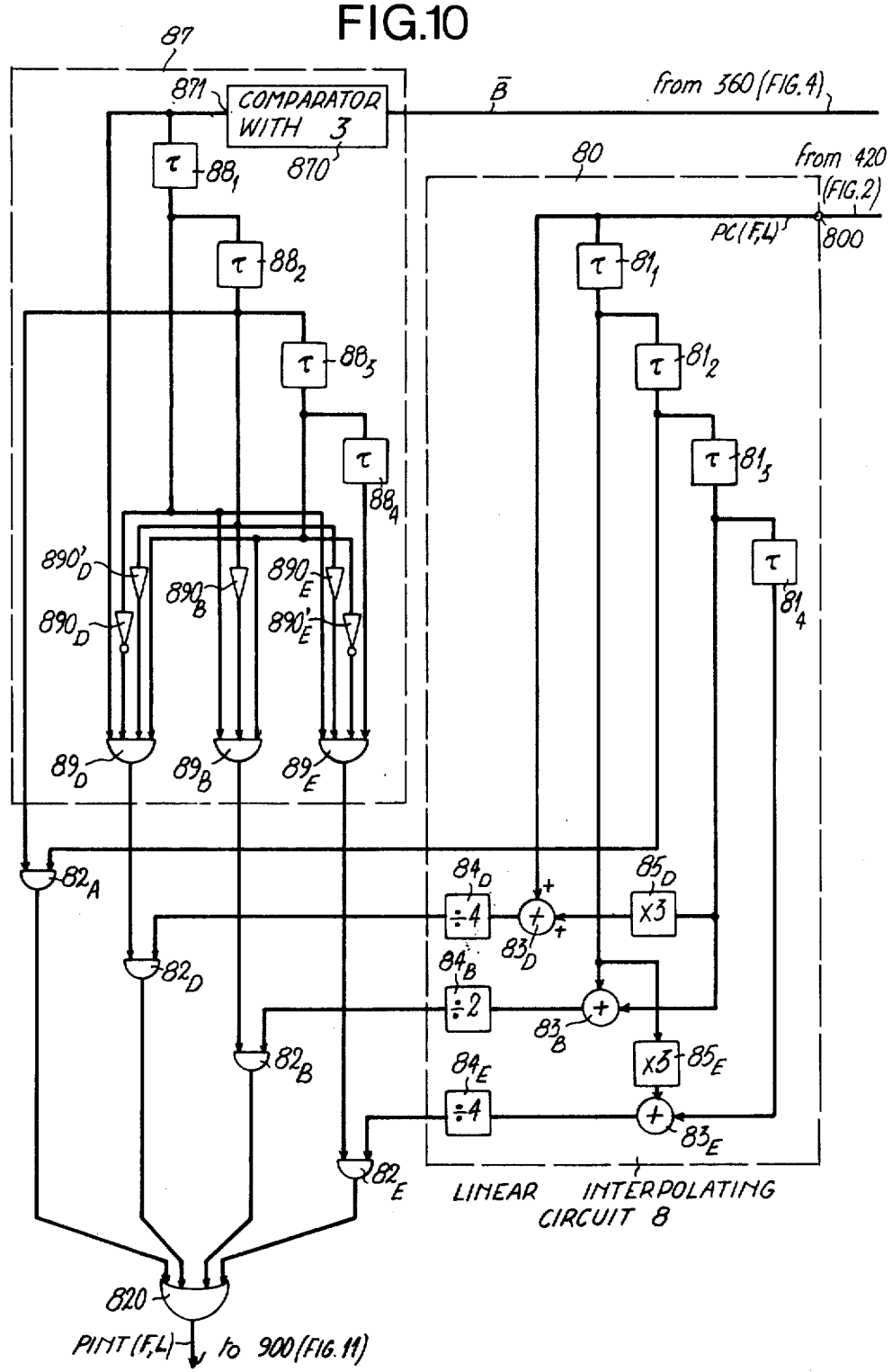
FIG. 10 is a detailed block diagram of a linear interpolating circuit.
Figure 11:
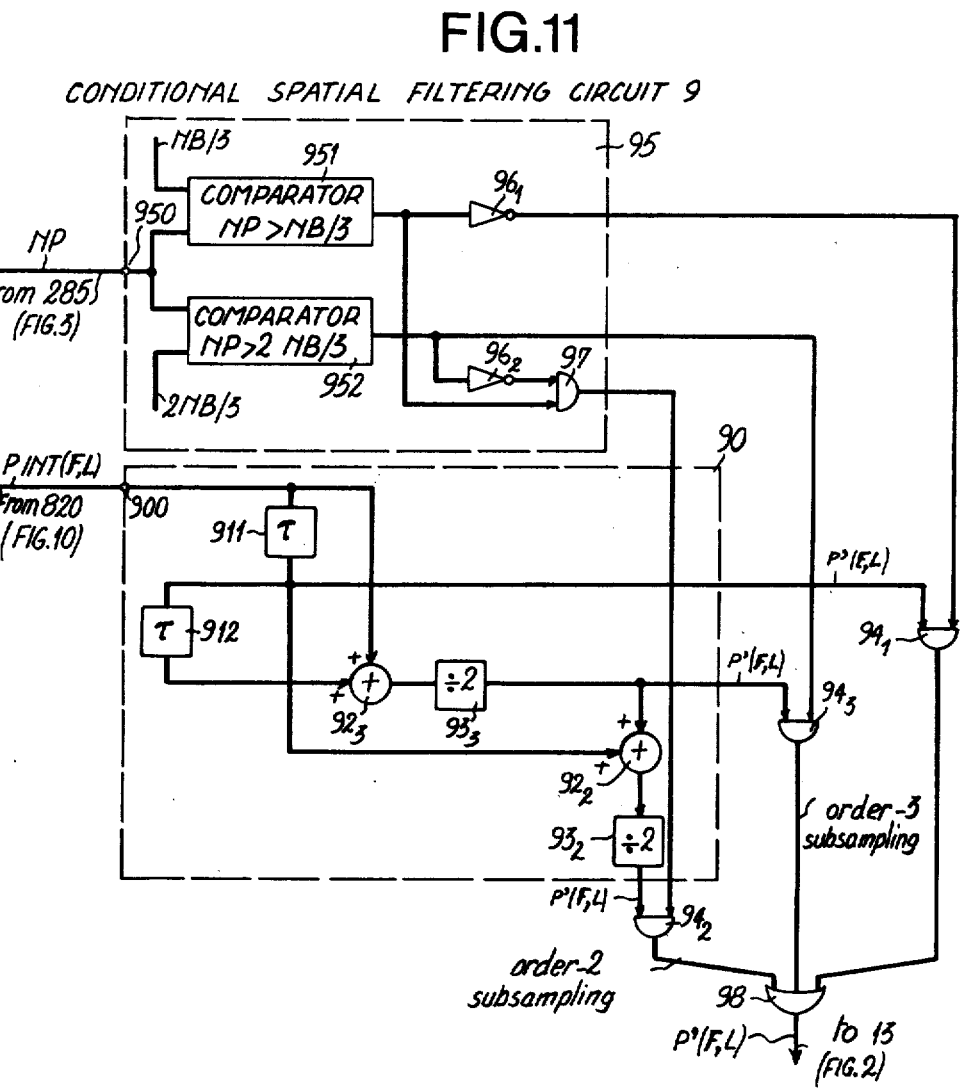
FIG. 11 is a detailed block diagram of a conditional spatial filtering circuit.

Reference is now made to FIGS. 10 and 11, a block diagram of a prefered embodiment of the interpolating circuit 8 and the conditional spatial filtering circuit 9 which are interconnected in series between the output 420 of the adder 42 which delivers the element word PC(F,L)=PP(F,L)+DP'(F,L), and the input 13 of the frame store 1, as shown in FIG. 2. The digital value PC(F,L) is substantially equal to P(F,L) transmitted to the input I of the encoding device, apart from the corresponding quantization difference in encoder and decoder 6-7 (or 6'-7'), when the pel word P(F,L) has been encoded and selected under the control of bit distributing circuit 3. On the other hand, when the element P(F,L) has been subsampled, i.e. not sampled and encoded in reference, for instance, to the last line of Table III, or belongs to the background areas $BA_1$ and $BA_2$ (FIG. 1), the output 420 of the adder 42 provides a word such that PC(F,L)=PP(F,L). In this case, DP'(F,L) is not calculated in the decoder 7 (or 7') and it becomes necessary to find a value approximating the actual incoming value P(F,L). The approximate value is formed by a linear interpolation process and conditional filtering with respect to the transmitted and encoded pel words and stored in the frame store 1 for processing of the lines following the previously processed line L.

The linear interpolation is performed in the interpolating circuit 8. The subsamples elements are thereby reconstituted based on the encoded PC(F,L) elements. Since the number of bits allocated to a line is equal to NB=231 bits and since the number of bits allocated to each sampled element, i.e. to each transmitted LEV(F,L) level word, is at least equal to 3 bits, the number of encoded elements is equal at most to NP=231/3=77. If we consider, for instance, only subsamplings of order 3, at most, then the videotelephone picture standard should not comprise more than 3×77=231 visible frame elements. The standard defined above is the maximum limit for such subsampling. Naturally, other standards having fewer than 231 visible picture elements per line are also possible. If the standard is, however, defined with more than 231 visible elements per line higher subsampling of an order of 4 or more must be considered. Because such subsampling sometimes creates a significant blurring of picture, the chosen embodiment is restricted to a subsampling of order 3.

Figure 12:
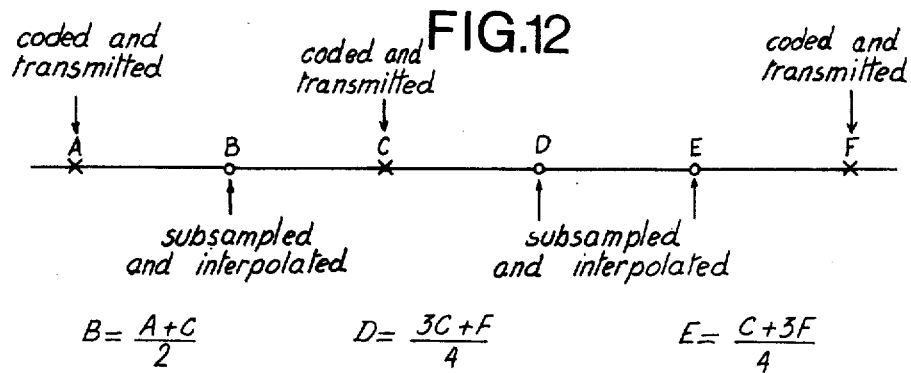
FIG. 12 is a diagram illustrating the subsampling in the moving area of a line.

Referring to FIG. 12, there is illustrated a sequence of consecutive elements A, B, C, D, E and F of the moving area SA of a line L. Elements such as A, C and F are designated by a cross and are sampled and correspond to the transmission of a LEV(F,L) word at the output of the encoder 6 (or 6'). Elements B, D and E, each designated by a circle, are subsampled and cause no transmission of LEV(P,L) word, ie. no transmission of word $\overline{B}$ through the output 360 of bit distributing circuit 3 (FIGS. 4 and 6). When NP≦NV/3, all the line elements in the SA area are encoded, the LEV (F,L) words comprise 3 to 6 bits whereby the output of the interpolating circuit 8 is indicated by a signal representing PINT (F,L)=PC(F,L). When NP>NB/3, certain elements are sampled and correspond to 3-bit LEV(F,L) words. In the latter case, when NB/3<NP≦2NB/3 an order-2 subsampling corresponding to an element such as B exists, and the interpolation word is:

$$PINT\ (F,L) = PC(F,L) \quad \text{(element A)}$$

or $$PINT(F,L) = \tfrac{1}{2}[(PC-1)(F,L)+(PC+1)(F,L)] \quad \text{(element B)}$$

and if 2NB/3<NP≦NB, there is a subsampling of at the most order 3, corresponding to elements such as D and E, and the interpolation word is:

$$PINT\ (F,L) = PC(F,L) \quad \text{(element A)}$$

or $$PINT\ (F,L) = \tfrac{1}{2}[(PC-1)(F,L)+(PC+1)(F,L)] \quad \text{(element B)}$$

or $$PINT\ (I,L) = \tfrac{1}{4}[3(PC-1)(F,L)+(PC+2)(F,L)] \quad \text{(element C)}$$

or $$PINT\ (I,L) = \tfrac{1}{4}[(PC-2)(F,L)+3(PC+1)(F,L)] \quad \text{(element E)}$$

These relations thus make it clear that the interpolated value PINT(F,L) of a subsampled element depends solely on those of the elements truly put into DPCM code and not on the predicted values PP(F,L) transmitted by the output 40 of the predictor 4.

As illustrated in FIG. 10, the interpolating circuit 8 comprises a circuit 80 for calculating signals representing the four above relations and a circuit 87 for selecting one of these signals in terms of the subsampling type.

The input 800 of the calculating circuit 80 receives, at a frequency of 1/τ the serial PC (F,L) words transmitted by the output 420 of the adder 42. The input 800 is connected to four delay lines $81_1$, $81_2$, $81_3$ and $81_4$ in series, each of which delays the PC(F,L) word by τ. Delay line $81_2$ transmits the PC(F,L) word with a delay of 2τ to a reading gate $82_A$, which is enabled for an element such as A. An adder $83_B$ has its inputs connected to the out puts of the delay lines $81_1$ and $81_3$ and has its output connected to the input of a reading gate $82_B$ via a divide-by-2 divider $84_B$. Consequently, the output of the divider $84_B$ provides PINT (F,L) as per the interpolation related to the element B. A second adder $83_D$ has one input directly connected to the input 800 of the interpolating circuit and another input connected to the output of the delay line $81_3$ via a multiply-by-3 multiplier $85_D$. A divide-by-4 divider $84_D$ is connected to the output of adder $83_D$ and transmits an interpolation word PINT(P,L), relating to an element such as D, to an input of a reading AND gate $82_D$. Finally, a third adder $83_E$ has one input which is connected to the output of the delay line $81_1$, via a multiply-by-3 multiplier $85_E$, and has its other input which is connected to the output of the delay line $81_4$. A divide-by-4 divider $84_E$ is connected to the output of the adder $83_E$ and delivers a PINT(F,L) word to the digital input of a reading AND gate $82_E$, per the interpolation relation of an element such as E.

The selecting circuit 87 comprises a three-comparator 870 which receives, via connection 360, B words which are delivered from bit distibuting circuit 3 (FIG. 4). It will be recalled that for each B word equal to at least 3 there is a corresponding encoded element word to be transmitted by the output of the encoder 6 (or 6'); there is also transmitted a DP' (F,L) word from the output of the decoder 7 (or 7') to the adder 42. If a $\overline{B}$ word is detected, the output 871 of the comparator 870 is in state "1" during time $\tau$, corresponding to a sampled element such as A,C or F (FIG. 12). If an element is subsampled, no $\overline{B}$ word is transmitted by the bit distribution circuit 3 and the comparator output is in state "0" during $\tau$. Selection circuit 87 further comprises four delay lines $88_1$ to $88_4$ which are connected in series to the output 871 of the comparator 870. The output of the second delay line $88_2$ directly controls the opening of gate $82_A$ for transmitting an interpolation word PINT(F,L) = PC(F,L) corresponding to a sampled element, such as A, i.e. each time that a $\overline{B}$ word is received by the comparator 870. An AND gate $89_B$ has three inputs, one of which is connected to the output of the delay line $88_2$ via an inverter $890_B$ and the other two being directly connected to the outputs of the delay lines $88_1$ and $88_3$. The output of the AND gate $89_B$ is in state "1" to enable the AND gate $82_B$ which provides a word PINT(F,L) = ½((PC−1) (F,L)+(PC+1)(F,L) each time two consecutive B words received by the comparator 870 are separated by $2\tau$; this corresponds to an order-2 subsampled element, such as $\overline{B}$. A second AND gate $89_D$ has four inputs, two of which are directly connected to the output 871 of the comparator 870 and to the output of the delay line $88_3$, and the other two of which are connected to the outputs of delay lines $88_1$ and $88_2$ via inverters $890_D$ and $890'_D$. A third AND gate $89_E$ has four inputs, two of which are connected directly to the outputs of delay lines $88_1$ and $88_4$ and the other two of which are connected to the outputs of the delay lines $88_2$ and $88_3$ via two inverters $890_E$ and $890'_E$. It can be seen that AND gates $89_D$ and $89_E$ are successively open during two consecutive subsamples elements of order 3. Each time comparator 870 detects two consecutive words B separated by $3\tau$, the AND gate $89_D$ enables AND gate $82_D$ for transmitting an interpolation word PINT(F,L-) = ¼[3(PC−1)(F,L)+(PC+2)(F,L)] corresponding to an element such as D; then, after a time $\tau$, the AND gate $89_E$ enables gate $82_E$ for transmitting an interpolation word PINT(F,L) = ¼[(PC−2) (F,L)+3(PC+1) (F,L)] corresponding to an element such as E. An OR gate 820 is connected to the outputs of the AND gates $82_A$, $82_C$, $82_D$ and $82_E$ and successively, at each time $\tau$, transmits an interpolation word PINT(F,L) to the input 900 of filtering circuit 9. Conditional spatial filtering circuit 9 operates as a low-pass filter so that the signal reconstituted in the receiver, after digital-to-analog conversion, does not have any spectrum overlap nor any step contours of the moving picture S on the background B. If the line L is not subjected to a subsampling (NP≦NB/3), the filtering circuit 9 directly delivers the word P'(F,L) = PINT(F,L) to the input 13 of frame store 1 for each of NP elements of the line L. On the other hand, if the line is subsampled, then filtering circuit 9 derives a signal representing P'(F,L) = ¼((-PINT−1) (F,L)+2PINT(F,L)+(PINT+1) (F,L) for an order −2 subsampling (NB/3<NP≦2NB/3), or P'(F,L) = ½((PINT−1) (F,L)+(PINT+1)(F,L)) for order −3 subsampling (2NB/3<NP≦NB); the P'(F,L) signal derived from circuit 9 is coupled to the input 13 of frame store 1 for each of NP elements of the line L.

The conditional spatial filtering circuit 9 shown in FIG. 11 essentially comprises a calculating circuit 90 for carrying out the three above mentioned filtering operations and a selecting circuit 95 for selecting one of the filtering depending on operations as a function of the three relations.

The input 900 of the calculating circuit 90 receives in series at a rate of $1/\tau$, the PINT(F,L) interpolation words which are transmitted from the output OR gate 820 of the interpolating circuit 8. The input 900 is connected to two series connected delay lines 911 and 912, each having a delay time $\tau$. The output of the delay line 911 delivers P'(F,L) directly to the digital input of a reading AND gate 94, which is related to a line that is not subsampled, and to one of the inputs of an adder $92_2$. The adder $92_3$ includes first and second inputs respectively responsive to the undelayed PINT(F,L) signal at terminal 900 and a replica of signal PINT(F,L) with a delay of $2\tau$, as derived from delay line 912. Adder 923 derives a signal representing P'(F,L), per the relation for order-3 subsampling; signal P'(F,L) is supplied to the digital input of a reading AND gate $94_3$, via a divide-by-2 divider $93_3$. The adder $92_2$ has its other input connected to the output of the divider $93_3$ and supplies P'(F,L), per the relation for order −2 subsampling, to an input of a reading AND gate $94_2$ via a divide-by-2 divider $93_2$. Engabling of the AND gate $94_1$ to $94_3$ is selectively controlled by the three outputs of the filtering selecting circuit 95. Selecting circuit 95 comprises two comparators 951 and 952 which receive via terminal 950, at the start of encoding of each line, a signal representing the number of elements NP of the picture area SA which is delivered by the register 285 of the movement detector 2 (FIG. 3). The comparator 951 compares NP with NB/3 and sets its output to the state "1" when NP>NB/3. The comparator 952 compares NP with 2NB/3 and sets its output to the state "1" when NP>2NB/3. When NP≦NB/3, (corrresponding to a not subsampled line L) the output of the comparator 951 is in state "0" which causes AND gate $94_1$ to be enabled because inverter $96_1$, is connected between the comparator output and the AND gate input. An AND gate 97 has one input connected directly to the input of the comparator 951 and another input connected, via an inverter $96_2$, to the output of the comparator 952. When NB/3<NP≦2NB/3 is satisfied, the output of the AND gate 97 is in state "1" to enable AND gate $94_2$ when gate 942 is enabled there is filtering of an order-2 subsampled line. Lastly, when NP>2NB/3, the output of the comparator 952 is in state "1" to enable AND gate $94_3$; when gate 943 is enabled there is filtering of an order -3 subsampled line. The output of one of reading AND gates $94_1$, $94_2$ and $94_3$ transmits in series, via an OR gate 98, the sequence of the NP suitable filtering P'(F,L) words of the processed line L to the input 13 of the frame store 1 which stores them. The other element words related to background areas $BA_1$ and/or $BA_2$, if present, are not modified in frame store 1, because writing into the frame store is controlled by means (not shown) solely during the transmission of the width $X_2 - X_1$ of the moving area SA of each line.

Figure 13:
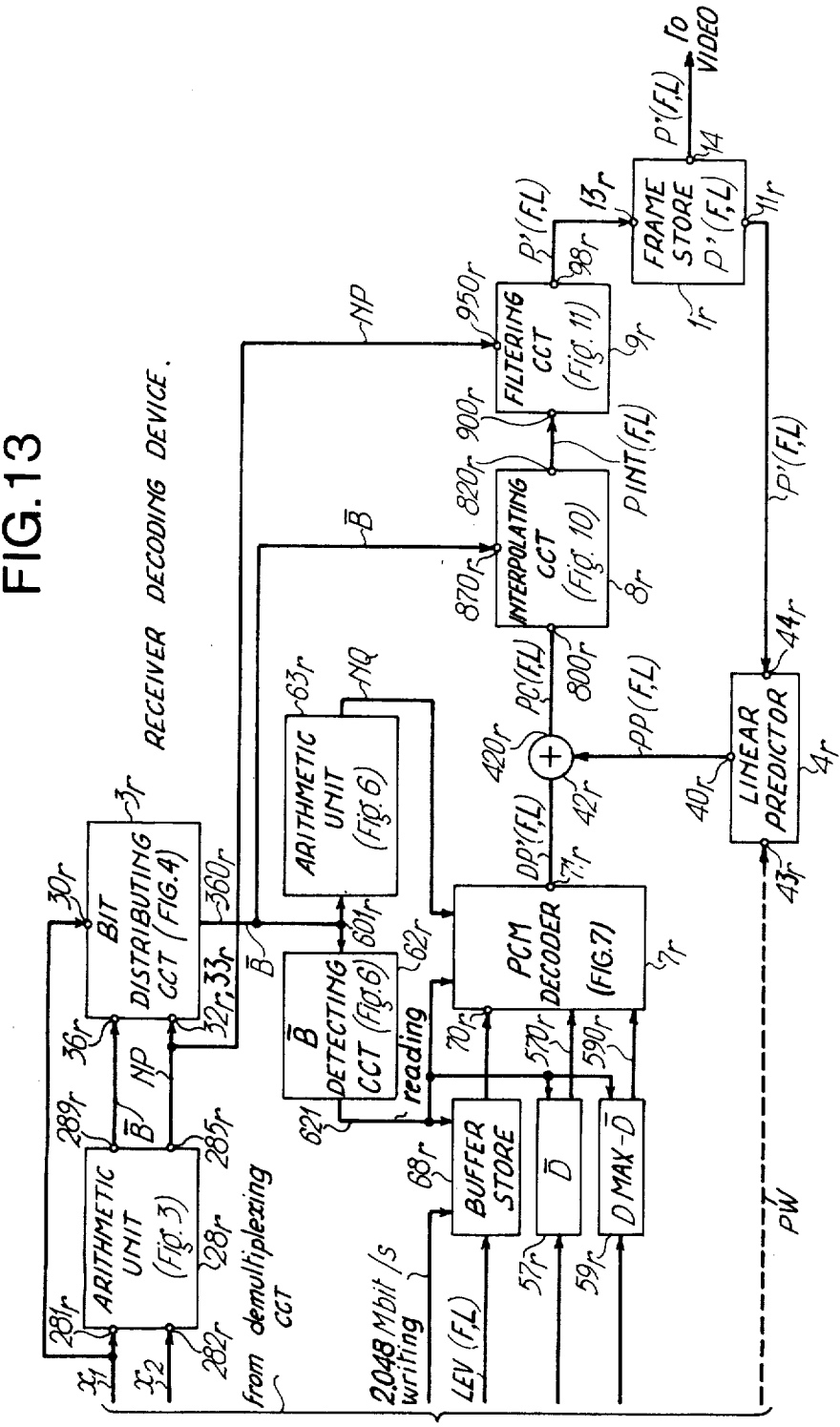
FIG. 13 is a block diagram of the decoding device of the receiver according to the first embodiment and partly to the second embodiment.

The decoding device at the receiver is shown in block form in FIG. 13. It performs the same operations of bit distribution, decoding, prediction, interpolation and filtering as those carried out in the encoding device in the transmitter.

After demultiplexing the data transmitted along the 2.048 Mbits/s digital link TNI, the input bus of the encoding device receives the line preamble words such as $X_1$, $X_2$, DMAX−$\overline{D}$, $\overline{D}$ and possibly PW and the LEV (F,L) data words which represent elements encoded by the distant speaker's transmitter encoding device. All the operations required for calculating the decoding parameters for the words of level LEV (F,L) are performed during the time interval preceding the video signal and peculiar to the reconstitution of the line synchronizing signal. Because all the line synchronizing and blanking signals and field synchronizing and blanking signal reconstituting circuits, as well as the time base transmitting the monitoring signals specific to the decoding are conventional, they will not be described in detail.

The blocks in FIG. 13 designated by the number references carrying the index r are identical to the blocks with the same reference numbers in the transmitter.

The $X_1$ and $X_2$ coordinate words indicating the start $M_1$ and end $M_2$ of SA area of the L line are applied to the inputs $281_r$ and $282_r$ of an arithmetic unit $28_r$; the $X_1$ word is also delivered to the down-counting input of a downcounter $28_r$ of a bit distributing circuit $3_r$. Arithmetic unit $28_r$ calculates the average bit number $\overline{B}$ which has been allocated to each LEV (F,L) word and the element number NP of moving area SA of the line L. Register $289_r$ of unit $28_r$ delivers a signal representing $\overline{B}$ to the digital input of the AND gate $36_r$ of a bit distributing circuit $3_r$ which is analogous to circuit 3 in FIG. 4. Register $285_r$ of unit $28_r$ delivers a signal representing NP to the triggering input of the down-counter $32_r$ and to one of the inputs of the multiply-by-NP multiplier $33_r$ of the bit distributing circuit $3_r$ and to the input $950_r$ of a conditional spatial filtering circuit $9_r$ which is analogous to the circuit 9 in FIG. 11. As in the transmitter, the bit distributing circuit $3_r$ transmits the word $\overline{B}$ at its output bus $360_r$ each time an element is sampled, i.e. at the most $NP_{max} = 77$ times per line. This transmission of words $\overline{B}$ takes place right from the start of the visible portion of the line to be reconstituted. Each word $\overline{B}$ is delivered, via bus $360_r$, to three comparators $870_r$ of a linear interpolating circuit $8_r$ which is analogous to the circuit 8 in FIG. 10, and to the common input $601_r$ of a B detecting circuit $62_r$ and an arithmetic unit $63_r$ which are analogous to 62 and 63 of the PCM encoder 6 shown in FIG. 6, respectively. The output of the unit $63_r$ delivers a signal representing the coefficients as a function of $NQ = 2^{\overline{B}}$ such as NQ/4, NQ/4−1, NQ/2−1, 3NQ/4 and 3NQ/4−1, to the appropriate inputs of a PCM decoder $7_r$ which is analogous to the decoder 7 in FIG. 7.

In view of the fact that the LEV (F,L) words are conveyed in series on the 2.048 Mbit/s digital link $TN_1$, a buffer store $68_r$ is provided with a capacity $NP_{max} = NB/3$. In the store $68_r$, the bits of the LEV(F,L) words are written at the frequency of 2.048 Mbits/s and each LEV(F,L) word is read during a time $\tau$ under the control of reading signal 621 which is delivered from the $\overline{B}$ detecting circuit $62_r$. The read words LEV(F,L) are applied to the input $70_p$ of the decoder $7_p$ and correspond solely to the sampled elements such as A, C and F shown in FIG. 12. The $\overline{D}$ and DMAX-$\overline{D}$ words of the line preamble, as supplied by the demultiplexing circuit of the receiver, are stored in two buffer registers $57_r$ and $59_r$ in response to the detection of the line L preamble; the $\overline{D}$ and DMAX-$\overline{D}$ words are read out of registers $57_r$ and $59_r$ under the control of reading signal 621 to the appropriate inputs of the decoder $7_r$, via bus-bars $570_r$ and $590_r$. The decoder $7_r$ calculates a quantization level DP'(F,L) each time its input $70_r$ receives a level word LEV(F,L).

Next, as in the transmitter encoding device, word DP' (I,L) is added in an adder $42_r$ to the corresponding predicted word PP (F,L) which is provided from the output $40_r$ of a linear predictor $4_r$, analogous to the prediction 4 of the encoding device. The predictor $4_r$ receives at its input $43_r$ via the demultiplexing circuit, a prediction indicating word PW which was included in the line preamble. It will be noted that, as in the encoding device, the predicted words PP (F, L) are established from quantization levels which are calculated in the encoder 6 (FIG. 6) and are selected under the control of analogous bit distributing circuits 3 (FIG. 4) and $3_r$. At the output $420_r$ of the adder $42_r$ are derived the decoded words PC (F,L), = PP (F,L)+DP' (F,L) supplied to the input $800_r$ of the linear interpolating circuit $8_r$. After interpolation of the decoded words in terms of the subsampling order, the output OR gate 820 of the circuit $8_r$ delivers a signal representing PINT (F,L) to the input $900_r$ of the conditional spatial filtering circuit $9_r$, the output OR gate $98_r$ of which supplies words P' (I,L) to the input $13_r$ of the frame store $1_r$ of the encoding device. The output $11_p$ of store $1_r$ transmits, at the $1/\tau$ rate, to the input $44_r$ of the predictor $4_r$ the element words P' (F,L) needed for the calculation of the predicted word PP (F,L) per one of the four predicted relations 1 to 4. The reading output 14 of the frame store $1_r$ serially supplies at the frequency $1/\tau$ the P' (F,L) words to the video means (screen) of the videotelephone after a digital-to-analog conversion.

Figure 9:
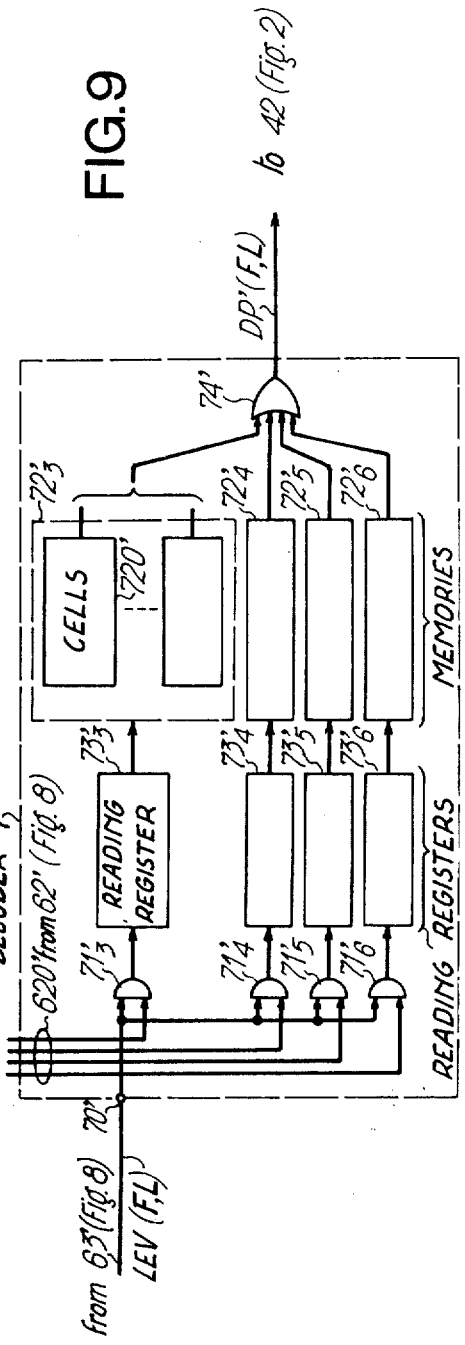
FIG. 9 is a detailed block diagram of the PCM decoder of the transmitter or receiver according to the second embodiment.

In the case of the second embodiment (FIGS. 8 and 9) of the encoding device, related to the static quantization levels selected as a function of the average bit number B allocated to an LEV(F, L) word, that the decoding device does not comprise an arithmetic unit $63_r$ and buffer registers $57_r$ and $59_r$, but has a PCM decoder which is analogous to that illustrated in FIG. 9. According to the embodiment relative to an available number of bits NB equal to 462 and to encoding of one field out of two, the store $1_r$ of the decoding device is a field store having a capacity one half that of the store used for the first embodiment. On the video side, the output of this field store is connected to a missing-field duplicating or reconstituting circuit.

Although the invention has been described in reference to a particular videotelephonic standard, it is to be appreciated that other embodiments using the invention are possible. The invention can include encoding and decoding devices for other incoming and outcoming digital rates which present ratios higher or lower than 8, and for incoming element word formats different from 8. Furthermore, the digital transmission medium can convey other secondary data signals, such as a telecopier channel for instance. Generally speaking, the subsampling order can be greater than 3 and the number of bits N allocated to a frame line can be of any value, but defined in any suitable way, depending on the incoming and outgoing digital bit rates. The data contained in the preamble of each line are such that they allow suitable decoding at the receiver. According to the first embodiment, they may further include $X_1$, $X_2$; $X_1$, $X_2-X_1$; $\overline{B}$, NP; or NQ, NP for example.

Moreover, the videotelephone signal may be a digital signal which is representative of monochromatic black and white pictures or a digital component signal representative of a chromatic or luminance component of a color video signal. In the latter case, three encoding and decoding systems are provided in parallel.

What we claim is:

1. A digital video system having an encoding device in a transmitter for encoding a digital video signal at a high given rate constituted of PCM words which have a predetermined bit number and are representative of consecutive picture elements of a scanned picture, into a digital encoded signal transmitted on a low rate digital transmission medium conveying words which are representative of present picture elements, the levels of which are susceptible to variation relative to those corresponding to the previous picture, said encoding device comprising:

picture storing means for storing the transmitted picture element words after the words have been interpolated;

means for detecting the moving area of the picture with respect to the previous stored picture in response to a comparison of the word difference between two words representative of two corresponding elements of the present picture and the previous stored picture with a predetermined threshold;

the number of data bits NB allocated to each line of a picture in said digital transmission medium being constant and the average number of bits $\overline{B}$ allocated to each encoded signal word of a line being greater than or equal to a first predetermined integer;

said moving area detecting means producing for each line of a picture the coordinates of the two ledge picture elements defining the moving area of said present picture with respect to the corresponding line of said previous pictures;

means for deducing the number NP of picture elements in said moving area of the line likely to be encoded from the produced coordinates of said two ledge picture elements and for deducing said average number of bits $\overline{B}$ for said line from the ratio NB/NP of said numbers NB and NP;

a linear predicting means for delivering DPCM predicted picture element words from the stored picture element words and present picture element words;

first and second down-counting means controlled by said movement area detecting means and having their counts $C_1$, $C_2$ set to NB and NP at the start of the moving area of each present picture line for down-counting the number of bits remaining to be allocated to said line and the number of picture element words remaining likely to be encoded at the line element frequency;

means connected to down-counting means for comparing the counts of said first and second down-counting means to select the DPCM words representing the picture elements to be transmitted each time $C_1/\overline{B} \geq C_2$;

means receiving said DPCM words and controlled by said comparing means for encoding, according to a predetermined quantization law, said selected DPCM words to multiplex said selected DPCM words in said digital transmission medium; and means connected to said encoding means for linearly interpolating the PCM unselected picture element words.

2. A digital video system as claimed in claim 1, in which said moving area detecting means further comprises means triggered at the start of the visible portion of each line for counting the elements of said line and means for controlling the reading of said counting means when the absolute difference values of a predetermined number of PCM consecutive picture element words of two corresponding lines of said present picture and said previous picture exceed said threshold and when the differences relative to the PCM consecutive picture element words have the same sign to produce said coordinates of said two ledge picture elements defining moving area of the present line.

3. A digital video system as claimed in claim 1 or 2, in which said number NP deducing means comprises comparing means for limiting said average number of bits $\overline{B}$ allocated to each encoded signal word to be equal to a second predetermined integer which said ratio NB/NP is more than a second predetermined integer, and to be equal to said first predetermined integer when said ratio NB/NP is less than said first predetermined integer.

4. A digital video system as claimed in claim 1, in which said encoding means comprises a PCM encoder for delivering for each selected DPCM picture element word a $\overline{B}$-bit word which is representative of the number of the quantization law level of said selected DPCM word and which is multiplexed in said digital transmission medium, a PCM decoder connected to said DPCM encoder for delivering for each $\overline{B}$-bit level word a decoded word having said predetermined number of bit number which is representative of the amplitude of the selected DPCM word quantization level and means for adding said decoded word to the corresponding DPCM predicted word in a PCM selected picture element word applied to said interpolating means.

5. A digital video system as claimed in claim 4, comprising means for calculating the maximum and average values DMAX, $\overline{D}$ of words in DPCM code for all the picture elements in said moving area of a line L and in which said encoding means selects a quantization law for each line, such that the quantization levels are equidistributed so half are between $-\overline{D}$ and $+\overline{D}$ and half are between $-DMAX$ and $-\overline{D}$ and between $\overline{D}$ and DMAX and are equal in number to $2^B$, the means for calculating including means for computing the quantization level corresponding to this law for each selected DPCM picture element word of said line.

6. A digital video system as claimed in claim 5, comprising delay means for delaying each line of said high rate digital video signal by a duration of two lines and in which for each line, said moving area detecting means calculating said coordinates of said two ledge picture elements of said moving area of said line during the reception of said line, said maximum and average value calculating means performing said calculation during the reception of the following first line and said encoding means encodes said selected DPCM words during the reception of the following second line.

7. A digital video system as claimed in claim 5 or 6, in which said maximum and average values calculating means comprises predicting means controlled by said moving area detecting means and analogous to said linear predicting means for calculating DPCM picture element words for all the elements in said moving area of said line based on the PCM picture element words of the corresponding elements transmitted by said high rate digital video signal and element picture words determined by predictions related to transmitted and possibly delayed high rate digital video signal words and to encoded and/or interpolated words stored in said picture storing means.

8. A digital video system as claimed in claim 4, in which said DPCM encoder comprises means for storing the level numbers of a plurality of predetermined quantization laws and means for storing words representative of the level amplitudes of said quantization laws and in which said count comparing means selects a pair of storage means relating to a quantization law having $2^{\bar{B}}$ levels as a function of said average bit number $\bar{B}$ and for each selected DPCM element picture word so that said encoder produces a PCM level number word by comparing the selected DPCM element picture word with the level amplitudes of the selected quantization law so that the DPCM decoder produces a decoded word representative of a selected quantification law level by comparing said produced PCM level number word with the level numbers of said selected quantization law.

9. A digital video system as claimed in claim 8, comprising delay means for delaying each line of said high rate digital video signal by a duration of one line, and in which, for each line, said moving area detecting means calculates said coordinates of said two ledge picture elements of said moving area of said line during reception of said line and said encoding means encodes said selected DPCM words during the reception of the following line.

10. A digital video system as claimed in claim 4 in which said linear interpolating means comprises means controlled by said count comparison means for distinguishing the PCM selected encoded picture element words and the subsampling order of the PCM untransmitted and unselected subsampled picture element word relative to the moving area of each line, where the subsampling order is greater than or equal to two, and means connected to the output of the adding means for linearly interpolating each subsampled picture element word as a function of its subsampled order and the immediately neighbouring selected picture element words.

11. A digital video system as claimed in claim 1 or 10, comprising lowpass digital filtering means interconnected between said linear interpolating means and the input of said picture storing means for filtering solely said PCM selected and subsampled element picture words.

12. A digital video system as claimed in claim 11, in which said filtering means selectively filters said PCM selected and subsampled words of each line by comparing the number NP of elements in said moving area of said line with said constant number of bits NB in terms of the maximum subsampling order likely to be produced by encoding said DPCM picture element words of said line.

13. A digital video system as claimed in claim 1, in which the number of bits allocated to each line in said digital transmission medium includes a predetermined number of bits which precede said number of data bits NB and which are assigned to a line preamble, said line preamble comprising: (a) a line synchronizing word, (b) words for indicating discriminations regarding the line encoding in said DPCM encoding means and the prediction in said linear predicting means, and (c) two words representative of said coordinates of said two ledge picture elements which define said moving area of said line.

14. A digital video system as claimed in claim 1 wherein a receiver responsive to the encoded digital signal includes a decoding device for decoding said digital encoded signal from digital transmission medium into a digital video signal having said high given rate, said decoding device comprising:
picture storing means for storing the received picture element words after the words have been interpolated;
linear predicting means analogous to that of said encoding device for delivering predicted picture element words from stored words;
means receiving said coordinates of said two ledge picture elements defining the moving area of each line for thereby deducing said number NP of said picture elements of said line moving area and the number of said data bits $\bar{B}$ allocated to each encoded signal word;
means receiving the encoded signal words for decoding said encoded words into decoded word as a function of said predetermined law;
down-counting means and comparing means analogous to those of said encoding device for controlling the reading of said DPCM encoded words in said decoding means at the frequency equal to said high given rate to deduce the PCM selected element picture words by addition to the corresponding predicted words; and
means connected to said decoding means for linearly interpolating the PCM unreceived element picture words of said moving area of said line as a function of said selected and received element picture words so as to store the PCM selected and interpolated picture element words in said picture storing means.

* * * * *